(12) United States Patent
Yamamura et al.

(10) Patent No.: US 9,967,485 B2
(45) Date of Patent: May 8, 2018

(54) RADIATION IMAGE CAPTURING APPARATUS

(71) Applicant: KONICA MINOLTA, INC., Chiyoda-ku, Tokyo (JP)

(72) Inventors: Takuya Yamamura, Mitaka (JP); Mao Eguchi, Kokubunji (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days. days.

(21) Appl. No.: 15/622,037

(22) Filed: Jun. 13, 2017

(65) Prior Publication Data

US 2017/0366767 A1 Dec. 21, 2017

(30) Foreign Application Priority Data

Jun. 15, 2016 (JP) .................................. 2016-118469

(51) Int. Cl.
*G01J 1/42* (2006.01)
*H04N 5/361* (2011.01)
*G01T 1/29* (2006.01)
*H04N 5/378* (2011.01)
*H04N 5/32* (2006.01)

(52) U.S. Cl.
CPC ........... *H04N 5/361* (2013.01); *G01T 1/2928* (2013.01); *H04N 5/32* (2013.01); *H04N 5/378* (2013.01)

(58) Field of Classification Search
CPC .............................. H04N 5/357; H04N 5/363

USPC ........................................ 250/370.11, 370.09
See application file for complete search history.

(56) References Cited

U.S. PATENT DOCUMENTS

| 2011/0108710 A1* | 5/2011 | Yonekawa | A61B 6/585 250/214 C |
| 2012/0097860 A1* | 4/2012 | Oguma | A61B 6/4233 250/394 |

FOREIGN PATENT DOCUMENTS

JP          2011142476 A          7/2011

* cited by examiner

*Primary Examiner* — Kenneth J Malkowski
(74) *Attorney, Agent, or Firm* — Holtz, Holtz & Volek PC

(57) ABSTRACT

A radiation image capturing apparatus includes scan lines, signal lines, radiation detection elements, bias lines, a readout IC, a control unit and a noise detection unit. The detection elements generate electric charges by receiving radiation. The readout IC reads respective image data based on the respective electric charges. The control unit controls at least the readout IC. At the time when each image data is read, the detection unit outputs data based on voltage noise in reverse bias voltage applied to the detection elements via the bias lines and/or voltage noise in off voltage applied to the scan lines. The control unit estimates an offset component in the output data, calculates noise data based on the output data and the offset component and subtracts the noise data from the image data, thereby generating corrected image data.

8 Claims, 15 Drawing Sheets

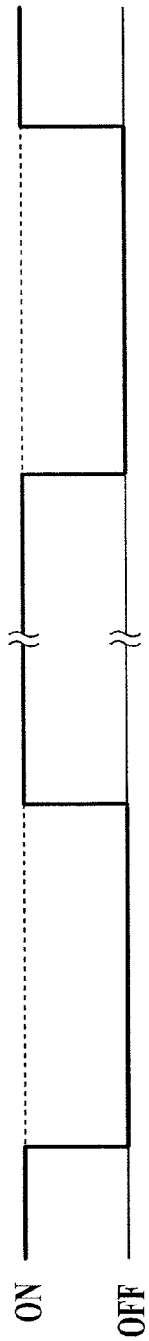
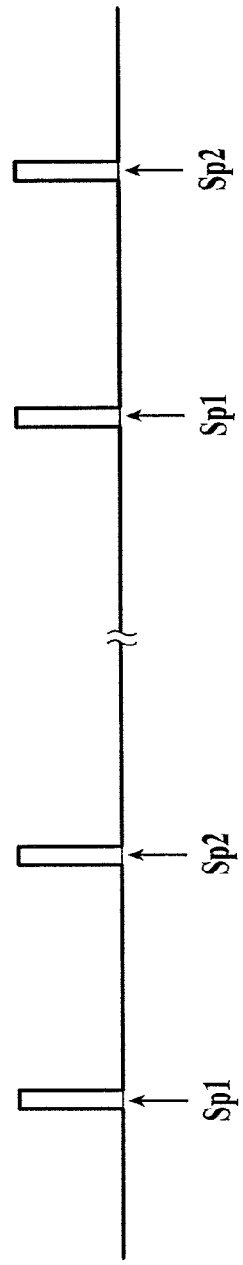
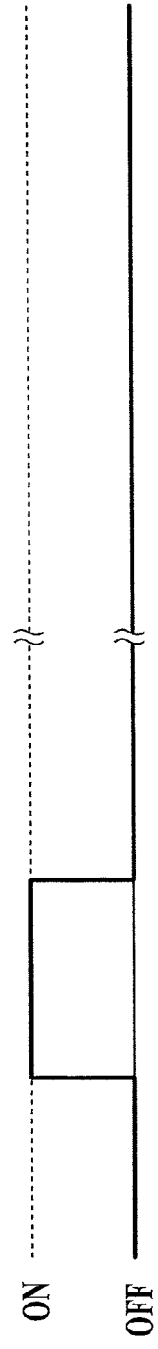
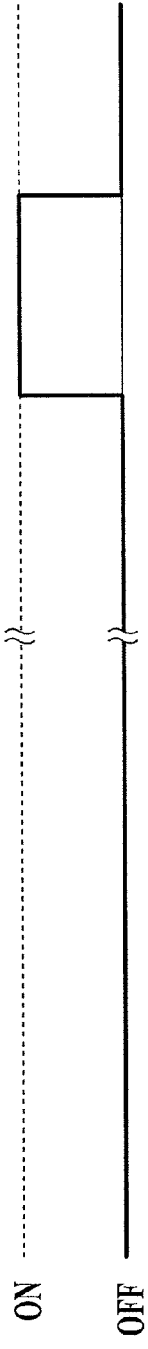

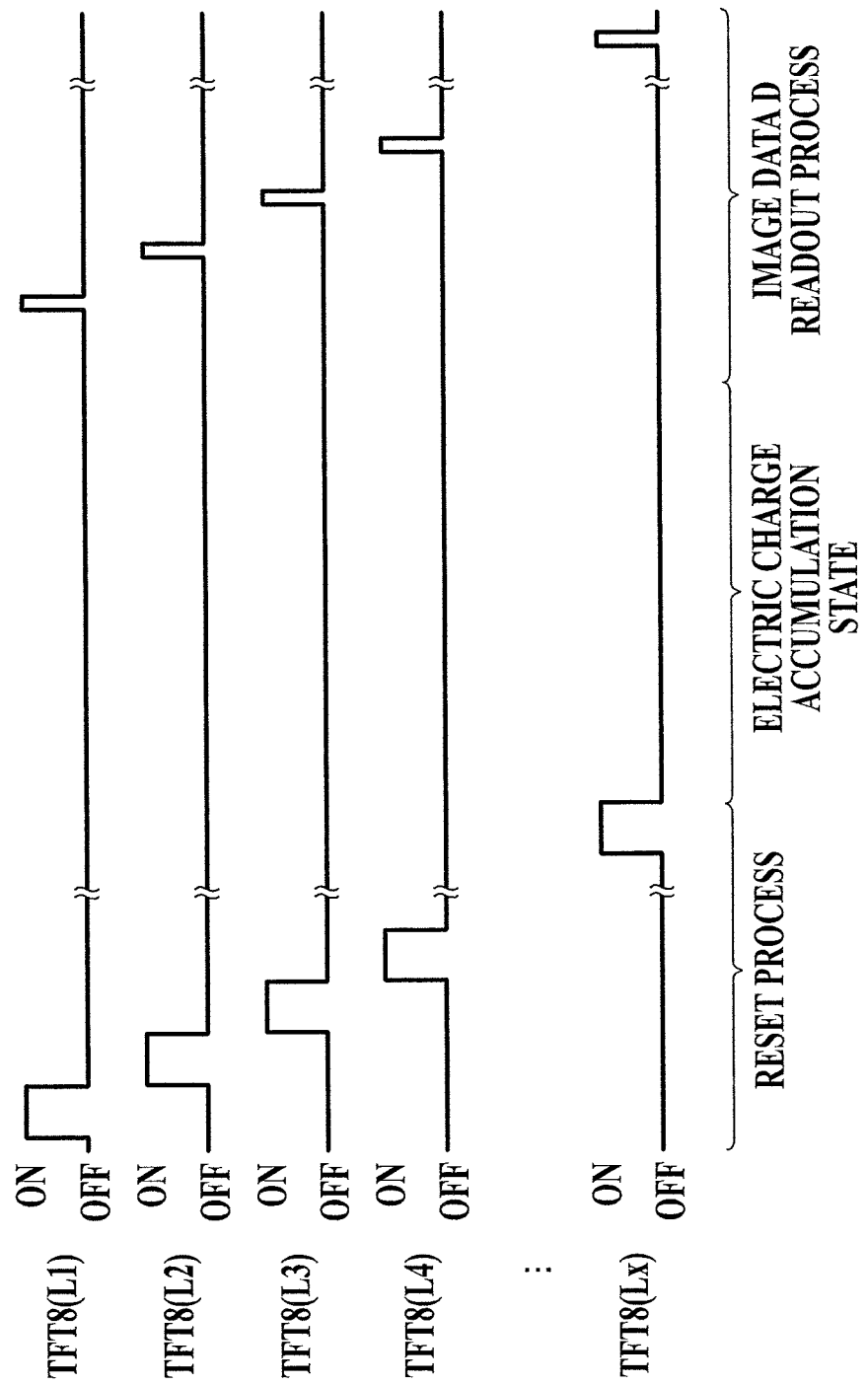

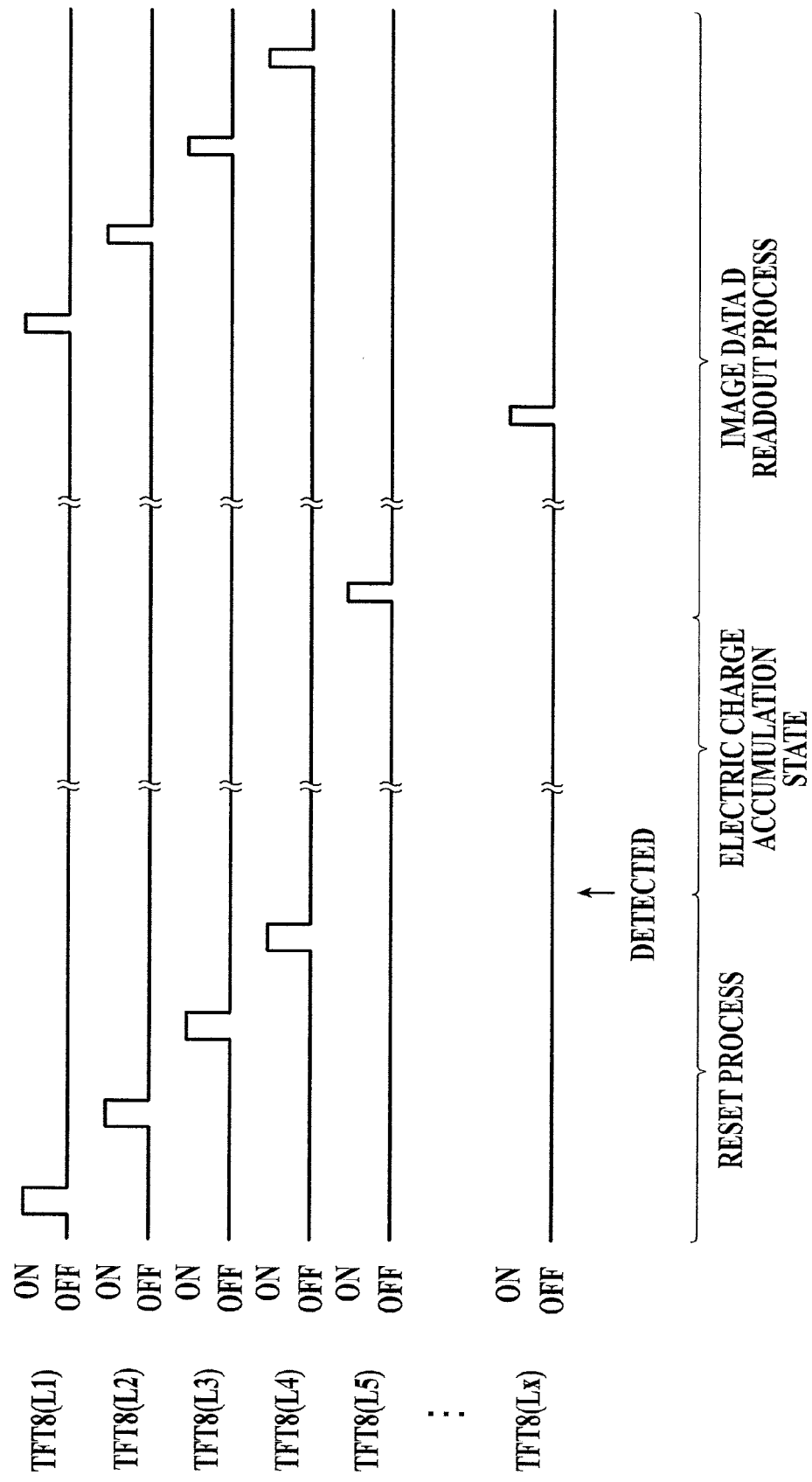

RADIATION IMAGE CAPTURING APPARATUS

CROSS-REFERENCE TO RELATED APPLICATIONS

The present U.S. patent application claims a priority under the Paris Convention of Japanese Patent Application No. 2016-118469 filed on Jun. 15, 2016, the entire disclosure of which, including the specification, claims, drawings and abstract, is incorporated herein by reference in its entirety.

BACKGROUND OF THE INVENTION

1. Field of the Invention

The present invention relates to a radiation image capturing apparatus.

2. Description of the Related Art

Various kinds of the so-called direct-type radiation image capturing apparatus and the so-called indirect-type radiation image capturing apparatus have been developed. The direct-type radiation image capturing apparatus generates electric charges according to the dose(s) of received radiation, such as X-rays, and converts the electric charges into electric signals with detection elements. The indirect-type radiation image capturing apparatus first converts received radiation into electromagnetic waves of another wavelength, such as visible light, with a scintillator or the like, and then generates electric charges according to the amount(s) of energy of the converted and received electromagnetic waves and converts the electric charges into electric signals with photoelectric conversion elements, such as photodiodes. In the present invention, the detection elements of the direct-type radiation image capturing apparatus and the photoelectric conversion elements of the indirect-type radiation image capturing apparatus are collectively called radiation detection elements.

Radiation image capturing apparatuses of these types are known as FPDs (Flat Panel Detectors), and each used to be formed integrally with a support (or an imaging table). Recently, portable radiation image capturing apparatuses of these types each made by placing radiation detection elements and other components in a housing have been developed and come into practical use.

In these radiation image capturing apparatuses, normally, as shown in FIG. 2 described below, scan lines 5 and signal lines 6 are arranged on a detection section P (i.e. the region inside a dot-and-dash line in FIG. 2) of a sensor board 4 in such a way as to intersect with each other, and radiation detection elements 7 are disposed in respective small regions r defined by the scan lines 5 and the signal lines 6. Thus, the radiation detection elements 7 are arranged two-dimensionally (in a matrix). To the radiation detection elements 7, bias lines 9 to apply reverse bias voltage to the radiation detection elements 7 are connected, and the bias lines 9 are connected to a tie line 10.

In an image data D readout process to read respective image data D from the radiation detection elements 7, ON voltage is sequentially applied from a gate driver 15b shown in FIG. 3 described below to lines L1 to Lx of the scan lines 5, the electric charges are released from the radiation detection elements 7 to the signal lines 6 via thin film transistors (TFTs) 8 in the ON state, and the image data D are read by readout circuits 17.

By the way, at a part where the bias lines 9 or the tie line 10 intersect with a signal line 6, normally, an insulating layer is provided to prevent them from being short-circuited. Hence, at this intersection part, a capacitor-like structure is formed by the bias lines 9 or the tie line 10, the signal line 6, and the insulating layer in between.

The above-described intersection part of the bias lines 9 or the tie line 10 with the signal line 6 (e.g. the "A" part in FIG. 2) is formed at many parts, and in the reverse bias voltage Vbias to be applied to the radiation detection elements 7 via the tie line 10 and the bias lines 9, as shown in FIG. 22, normally, noise (fluctuation) is generated. Hereinafter, the noise generated in voltage, such as the reverse bias voltage Vbias, is called voltage noise.

Meanwhile, to the signal lines 6, voltage $V_0$ is applied, and at each of the intersection parts of the bias lines 9 or the tie line 10 with the signal lines 6, because of the parasitic capacitance, the electric charge equivalent to potential difference Vbias-$V_0$ between the voltage $V_0$ of the signal line 6 and the reverse bias voltage Vbias of the bias lines 9 or the tie line 10 is generated. The voltage noise generated in the reverse bias voltage Vbias is converted into noise of electric charge (hereinafter "electric charge noise") due to the parasitic capacitance. Hence, in the electric charge generated at each of the intersection parts of the bias lines 9 or the tie line 10 with the signal lines 6, the electric charge noise equivalent to the voltage noise of the reverse bias voltage Vbias is generated.

Then, in the image data D readout process, if, at the time t0 shown in FIG. 22, the ON voltage is applied from the gate driver 15b to a scan line 5, and the electric charges are released to the signal lines 6 from the radiation detection elements 7 connected to the scan line 5, the electric charge noise equivalent to the voltage noise generated at the time in the reverse bias voltage Vbias (t0) is superimposed on the electric charges, and the electric charges with the voltage noise flow into the readout circuits 17. Hence, on the respective image data D read from the radiation detection elements 7 at the time t0, noise data of the same size equivalent to the electric charge noise equivalent to the voltage noise generated in the reverse bias voltage Vbias(t0) are superimposed.

Further, on the respective image data D read from the radiation detection elements 7 connected to the scan line 5 to which the ON voltage is applied at the time t1, which is different time from the above, noise data of the same size are superimposed as described above, but the size of the noise data is different from the size of the noise data superimposed on the image data D read at the time t0. Further, on the respective image data D read from the radiation detection elements 7 connected to the scan line 5 to which the ON voltage is applied at the time t2, which is yet different time from either of the above, noise data of the same size are superimposed as described above, but the size of the noise data is different from either of the size of the noise data superimposed on the image data D read at the time t0 and the size of the noise data superimposed on the image data D read at the time t1.

Because the size of the noise data superimposed on the image data D is different from a scan line 5 to a scan line 5, if a radiation image is generated based on the image data D read as described above, a striped pattern extending in the scan line direction (normally, this direction is the horizontal direction) appears therein. This phenomenon, namely, appearance of the striped pattern extending in the scan line direction, is generally called horizontal noise.

In order to prevent the horizontal noise from appearing in radiation images, there is described, for example, in Japanese Patent Application Publication No. 2011-142476 (Patent Document 1) a radiation image capturing apparatus provided with a noise detection circuit which converts voltage noise generated in the reverse bias voltage Vbias of the bias lines 9 or the tie line 10 into electric charge noise and thereby detects the electric charge noise. In the image data D readout process, this radiation image capturing apparatus reads noise data with the noise detection circuit at the same time as when applying the ON voltage from the gate driver 15b to each of the lines L1 to Lx of the scan lines 5 and reading the image data D, and subtracts the noise data from the image data D. Thus, influence of the horizontal noise on radiation images can be reduced.

It is known that when a radiation image capturing apparatus is configured as described in Patent Document 1, for example, in the case of plain radiography (also called still image capturing or the like), in which a radiation emission apparatus emits radiation to a radiation image capturing apparatus one time to capture a still image, influence of the horizontal noise on a still image to be captured can be removed relatively well.

However, according to the studies of the inventors of this application, for example, in the case of moving image capturing with a radiation image capturing apparatus, if the radiation image capturing apparatus is configured as described above, although influence of the horizontal noise on frame images of a moving image to be generated based on values obtained by subtracting the noise data from the image data D can be removed, artifacts (image unevenness or the like) may appear in the frame images.

If the artifacts appear in the frame images, the moving image is difficult to see. In addition, if the dose of radiation emitted to the subject is calculated based on the image data D of the frame images (i.e. the image data D from which the noise data has been subtracted), the dose different from the actual one may be calculated.

Further, the horizontal noise could appear not only due to the parasitic capacitances at the intersection parts of the bias lines 9 or the tie line 10 with the signal lines 6 (e.g. at the "A" part in FIG. 2 described below) but also due to the parasitic capacitance(s) at an intersection part(s) of a scan line(s) 5 with a signal line(s) 6 (e.g. at the "B" part in FIG. 2 described below).

The intersection part of the scan line 5 with the signal line 6 is formed at many parts, and in the OFF voltage to be applied to the scan lines 5, normally, noise (fluctuation), namely, voltage noise, is generated. Hence, the horizontal noise may appear like the above. For example, in the case of moving image capturing with a radiation image capturing apparatus, if the radiation image capturing apparatus employs the method described in Patent Document 1, although influence of the horizontal noise on frame images of a moving image to be generated based on values obtained by subtracting the noise data from the image data D can be removed, the artifacts may appear in the frame images.

BRIEF SUMMARY OF THE INVENTION

The present invention has been conceived in view of the above problems, and objects of the present invention include providing a radiation image capturing apparatus which, in moving image capturing and so forth, can reduce influence of the horizontal noise on radiation images (e.g. frame images) to be generated and also can accurately prevent the artifacts from appearing in the radiation images.

In order to achieve at least one of the above or other objects, according to an aspect of preferred embodiments of the present invention, there is provided a radiation image capturing apparatus including: a plurality of scan lines; a plurality of signal lines; a plurality of radiation detection elements arranged on a board to be distributed two-dimensionally, the radiation detection elements generating respective electric charges by receiving radiation and thereby being irradiated; a plurality of bias lines to apply reverse bias voltage to the radiation detection elements; a readout IC which reads respective image data based on the respective electric charges generated by the radiation detection elements, whereby an image data readout process is performed; a control unit which controls at least the readout IC; and a noise detection unit which, at time when each of the image data is read, outputs data based on at least one of (i) voltage noise generated in the reverse bias voltage applied to the radiation detection elements via the bias lines and (ii) voltage noise generated in off voltage applied to the scan lines, wherein the control unit: estimates an offset component contained in the data output by the noise detection unit; calculates noise data based on the data output by the noise detection unit and the estimated offset component; and subtracts the calculated noise data from the image data read by the readout IC, thereby generating corrected image data.

BRIEF DESCRIPTION OF THE SEVERAL VIEWS OF THE DRAWING

The present invention is fully understood from the detailed description given hereinafter and the accompanying drawings, which are given by way of illustration only and thus are not intended to limit the present invention, wherein:

FIG. 5A to FIG. 5D show a timing chart of change in voltage of an electric charge reset switch, pulse signals, a scan line and its next scan line in the image data readout process;

FIG. 6 is a timing chart showing timings at which the ON voltage is applied to scan lines in the case of image capturing employing a cooperation system;

FIG. 7 is a timing chart showing timings at which the ON voltage is applied to the scan lines in the case of image capturing employing a non-cooperation system;

DETAILED DESCRIPTION OF THE INVENTION

Hereinafter, an embodiment(s) of a radiation image capturing apparatus of the present invention is described with reference to the drawings.

The radiation image capturing apparatus described below is portable. However, the present invention is also applicable to a radiation image capturing apparatus formed integrally with a support or the like.

[Radiation Image Capturing Apparatus]

Figure 1:
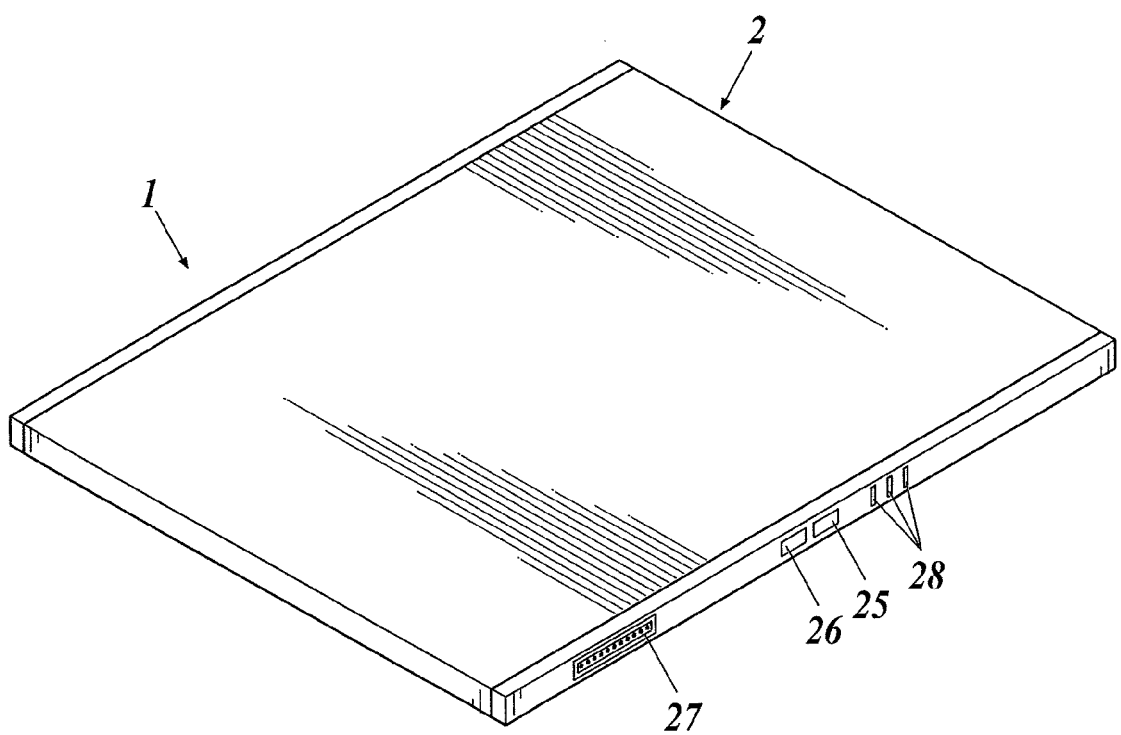
FIG. 1 is a perspective view showing the external appearance of a radiation image capturing apparatus according to embodiments of the present invention.
Figure 2:
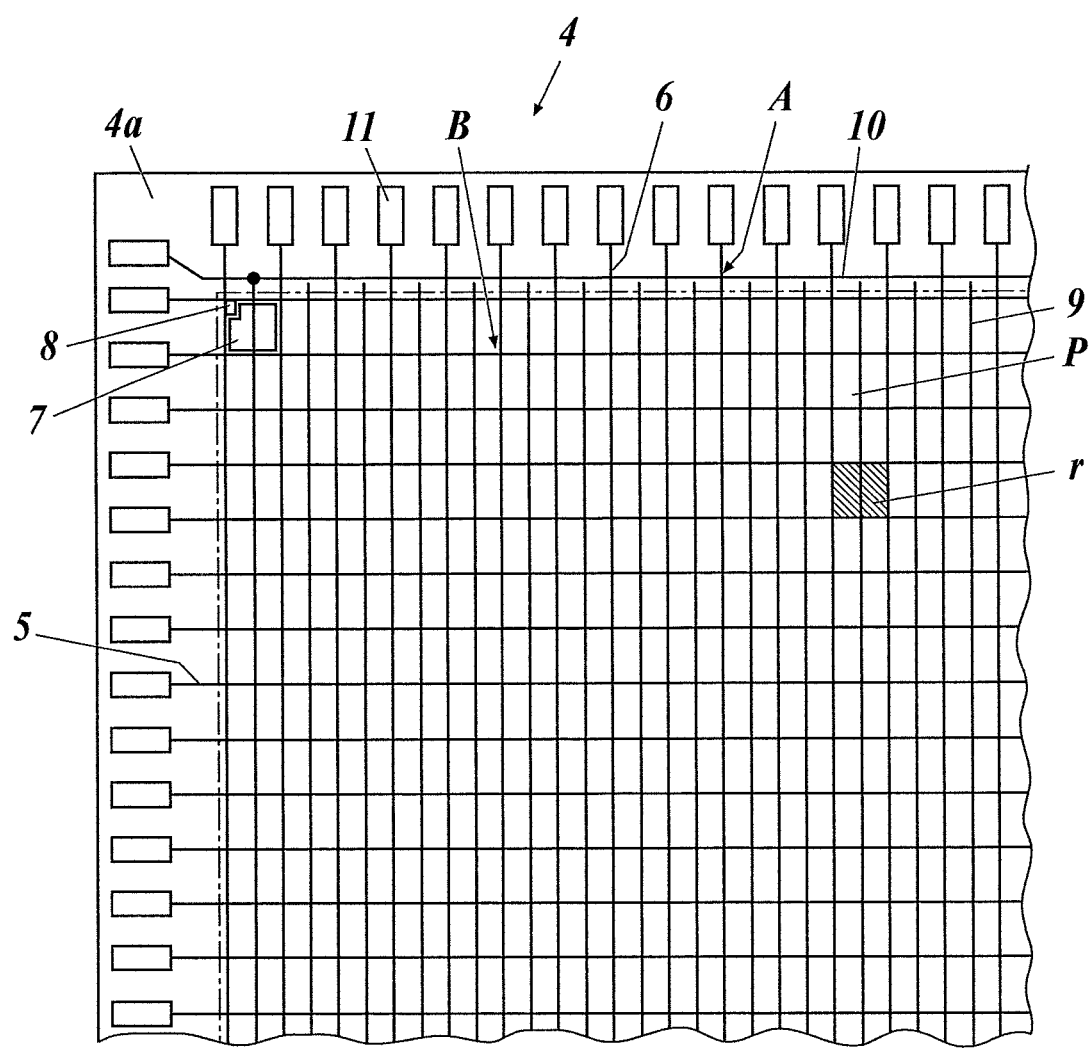
FIG. 2 is a plan view showing a configuration example of a sensor board.
Figure 3:
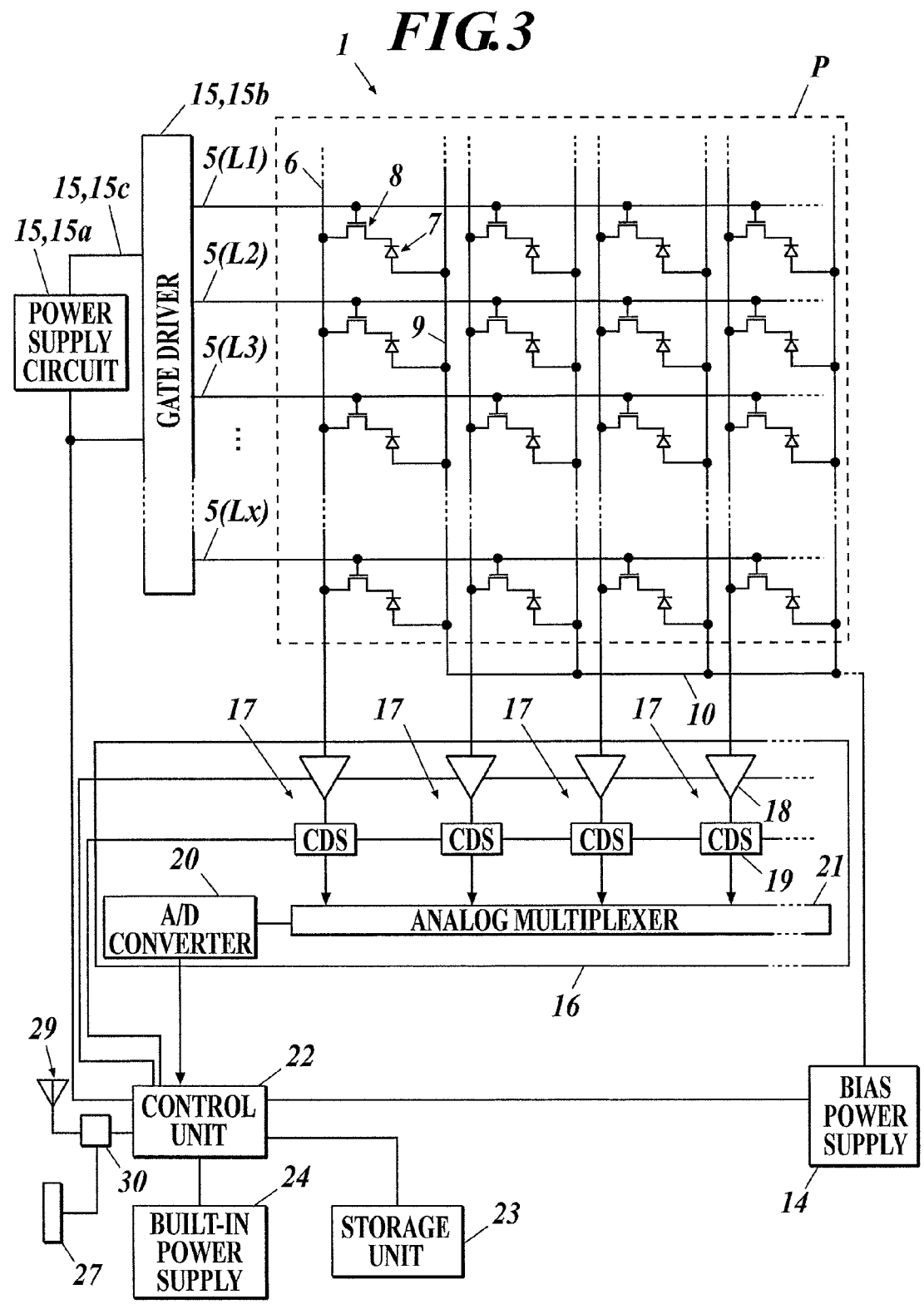
FIG. 3 is a block diagram showing an equivalent circuit of the radiation image capturing apparatus.
Figure 4:
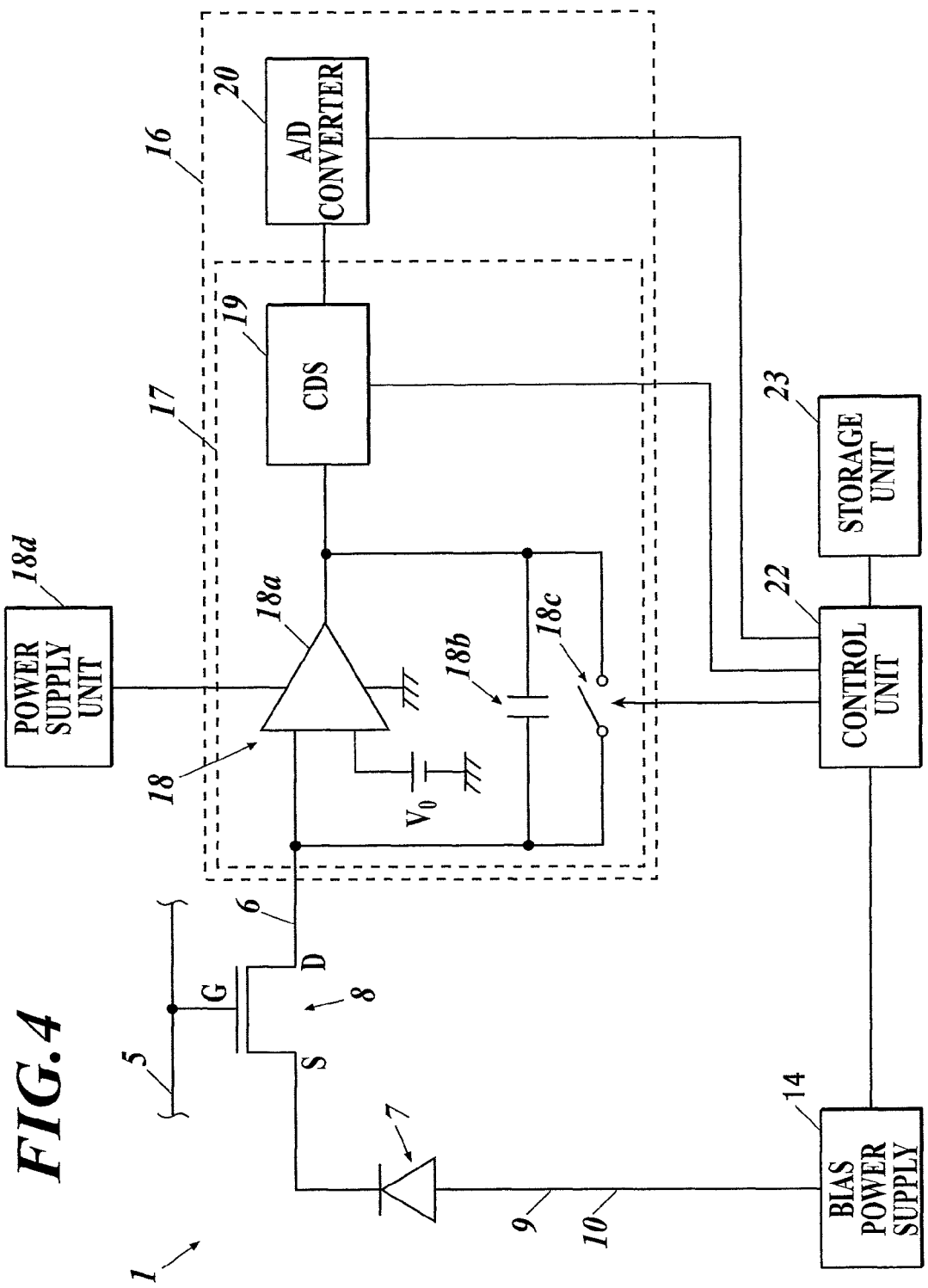
FIG. 4 is a block diagram showing an equivalent circuit of one pixel of a detection section.

FIG. 1 is a perspective view showing the external appearance of a radiation image capturing apparatus according to embodiments of the present invention. FIG. 2 is a plan view showing a configuration example of a sensor board. FIG. 3 is a block diagram showing an equivalent circuit of the radiation image capturing apparatus, and FIG. 4 is a block diagram showing an equivalent circuit of one pixel thereof. A radiation image capturing apparatus 1 is formed in such a way that a sensor board 4 on which radiation detection elements 7 are arranged and other components are placed in a housing 2.

As shown in FIG. 1, one lateral surface of the housing 2 of the radiation image capturing apparatus 1 is provided with a power switch 25, a switch 26, a connector 27, indicators 28 and so forth. Further, although not shown, the opposite lateral surface of the housing 2 is provided with an antenna 29 (see FIG. 3) for wireless communications with external apparatuses.

As shown in FIG. 2 and FIG. 3, in the embodiment, the radiation detection elements 7 are two-dimensionally arranged on the front/upper surface 4a of the sensor board 4, and the region where the radiation detection elements 7 are arranged is a detection section P. In the embodiment, scan lines 5 and signal lines 6 are arranged on the sensor board 4 in such a way as to intersect with each other, and the radiation detection elements 7 are disposed in respective small regions r defined by the scan lines 5 and the signal lines 6.

As shown in FIG. 2 to FIG. 4, the radiation detection elements 7 are connected to bias lines 9. In the embodiment, the bias lines 9 are connected to a tie line 10, and as shown by the "A" part of FIG. 2, the tie line 10 and each signal line 6 intersect with each other via a not-shown insulating layer. To the radiation detection elements 7, the reverse bias voltage Vbias is applied from a bias power supply 14 via the bias lines 9 and the tie line 10 thereof.

In the radiation detection elements 7, electric charges according to the dose(s) of radiation emitted thereto and received thereby are generated. The radiation detection elements 7 are connected with TFTs 8 which are switching elements, and the TFTs 8 are connected to the signal lines 6. As shown in FIG. 2, at the ends of the scan lines 5, the signal lines 6, the tie line 10 and the like, pads 11 are provided, and wirings of a not-shown flexible circuit board(s) and so forth are connected to the pads 11. The scan lines 5, the signal lines 6, the tie line 10 and the like are connected to a not-shown electronic device(s) (e.g. the bias power supply 14) disposed on the back/lower surface side of the sensor board 4.

In a scan driving unit 15, the ON voltage and the OFF voltage are supplied from a power supply circuit 15a to a gate driver 15b via a wiring 15c. The gate driver 15b switches voltage to be applied to each of lines L1 to Lx of the scan lines 5 between the ON voltage and the OFF voltage. When the OFF voltage is applied to the TFTs 8 via the scan lines 5, the TFTs 8 go into the OFF state and break electrical continuity of the radiation detection elements 7 and the signal lines 6 so that the electric charges are accumulated in the radiation detection elements 7. On the other hand, when the ON voltage is applied to the TFTs 8 via the scan lines 5, the TFTs 8 go into the ON state and release the electric charges accumulated in the radiation detection elements 7 to the signal lines 6.

The signal lines 6 are connected to readout circuits 17 built in a readout IC(s) 16. The readout circuits 17 include their respective integrating circuits 18 and correlated double sampling circuits 19, a shared analog multiplexer 21, and a shared A/D converter 20. In FIG. 3 and FIG. 4, the correlated double sampling circuits 19 are denoted as "CDS", and in FIG. 4, the analog multiplexer 21 is omitted.

In the embodiment, each integrating circuit 18 is constituted of an operational amplifier 18a, a capacitor 18b and an electric charge reset switch 18c which are connected in parallel. The inverting input terminal of the operational amplifier 18a of the integrating circuit 18 is connected to its corresponding signal line 6, and reference voltage $V_0$ is applied to the non-inverting input terminal of the operational amplifier 18a of the integrating circuit 18. Hence, the reference voltage $V_0$ is applied to the signal line 6.

The electric charge reset switches 18c of the integrating circuits 18 are connected to a control unit 22 so that ON and OFF of the electric charge reset switches 18c are controlled by the control unit 22. When the electric charge reset switches 18c are in the OFF state, and the TFTs 8 go into the ON state, the electric charges released from the radiation detection elements 7 flow into and are accumulated in the capacitors 18b, and voltage values equivalent to the amounts of the accumulated electric charges are output from the output terminals of the operational amplifiers 18a.

When the electric charge reset switches 18c go into the ON state, the input sides and the output sides of the integrating circuits 18 are short-circuited, so that the electric charges accumulated in the capacitors 18b are released, whereby the capacitors 18b are reset. The integrating circuits 18 are driven by power supplied from a power supply unit 18d.

In the image data D readout process to read the respective image data D from the radiation detection elements 7 (see FIG. 6 and FIG. 7 described below), which is performed after image capturing, when the electric charge reset switches 18c of the integrating circuits 18 go into the OFF state and the first pulse signal Sp1 is sent from the control unit 22 as shown in FIG. 5A to FIG. 5D, the correlated sampling circuits 19 keep voltage values Vin output from the integrating circuits 18 at the time.

Then, the ON voltage is applied from the gate driver 15b to the line Ln of the scan lines 5. When the TFTs 8 go into the ON state, the electric charges are released to the signal lines 6 from the radiation detection elements 7 connected to the line Ln of the scan lines 5 via the TFTs 8, and flow into the capacitors 18b of the readout circuits 17 via the signal lines 6, so that the voltage values output from the integrating circuit 18 increase.

When the second pulse signal Sp2 is sent from the control unit 22, the correlated sampling circuits 19 keep voltage values Vfi output from the integrating circuits 18 at the time, and output and thereby read differences Vfi−Vin as analog value image data D. The output image data D are sequentially sent to the A/D converter 20 via the analog multiplexer 21. The A/D converter 20 sequentially converts the received image data D into digital value image data D, and the image data D are sequentially stored in a storage unit 23.

As shown in FIG. 5C and FIG. 5D, the ON voltage is sequentially applied from the gate driver 15b to the lines L1 to Lx of the scan lines 5 (in FIG. 5C and FIG. 5D, to the line Ln and then the next line Ln+1 of the scan lines 5), and the above process is repeated, whereby the image data D are read from all of the respective radiation detection elements 7.

The control unit 22 is constituted of, for example, a computer or an FPGA (Field Programmable Gate Array). The computer includes a CPU (Central Processing Unit), a ROM (Read Only Memory), a RAM (Random Access Memory) and an input-output interface which are connected to a bus (all not shown). The control unit 22 may be constituted of a specialized control circuit.

The control unit 22 is connected with: the storage unit 23 constituted of, for example, an SRAM (Static RAM), an SDRAM (Synchronous DRAM) or an NAND flash memory; and a built in power supply 24. The control unit 22 is also connected with a communication unit 30 for wireless or wired communications with external apparatuses via the aforementioned antenna 29 or connector 27.

The control unit 22 performs a variety of control. For example, the control unit 22 controls actions of the scan driving unit 15 so as to perform a radiation detection element 7 reset process to reset the radiation detection elements 7, and also causes the scan driving unit 15 to apply the OFF voltage from the gate driver 15b to the TFTs 8 via the lines L1 to Lx of the scan lines 5 so as to shift to an electric charge accumulation state in which electric charges are accumulated. As another example, the control unit 22 controls actions of the scan driving unit 15, the readout circuits 17 and so forth to perform the image data D readout process to read the image data D from the radiation detection elements 7.

In the embodiment, the control unit 22 stores the read image data D in the storage unit 23 as described above. Further, the control unit 22 causes the communication unit 30 to transfer the image data D to a not-shown image processing apparatus at predetermined timings by wireless communications or wired communications via the antenna 29 or the connector 27.

[Processes, Etc. Of Radiation Image Capturing Apparatus at or Around the Time of Image Capturing]

The radiation image capturing apparatus 1 may be configured to perform image capturing by exchanging signals or the like with a not-shown radiation emission apparatus which emits radiation to the radiation image capturing apparatus 1 (cooperation system). In this case, as shown in FIG. 6, before radiation is emitted, the control unit 22 causes the scan driving unit 15 to sequentially apply the ON voltage from the gate driver 15b (see FIG. 3) to the lines L1 to Lx of the scan lines 5 so as to perform the radiation detection element 7 reset process.

When receiving a signal which indicates emission of radiation from the radiation emission apparatus, the control unit 22 causes the scan driving unit 15 to apply the OFF voltage from the gate driver 15b to the lines L1 to Lx of the scan lines 5 so as to shift to the electric charge accumulation state in which the electric charges generated in the irradiated radiation detection elements 7 are accumulated therein. When emission of radiation (irradiation) finishes, the control unit 22 causes the scan driving unit 15 to sequentially apply the ON voltage from the gate driver 15b to the lines L1 to Lx of the scan lines 5 so as to perform the image data D readout process.

The radiation image capturing apparatus 1 may be configured to perform image capturing without exchanging signals or the like with the radiation emission apparatus (non-cooperation system). In this case, unlike the case of the cooperation system, the radiation image capturing apparatus 1 cannot receive the signal which indicates emission of radiation from the radiation emission apparatus. Hence, the radiation image capturing apparatus 1 is configured to detect start of irradiation by itself as start of emission of radiation. For the detection process of start of irradiation, methods described, for example, in Japanese Patent Application Publication No. 2009-219538 and International Patent Application Publication. No. 2011/135917 and No. 2011/152093 can be employed. For details, refer to these documents, etc.

In the case of the non-cooperation system too, as shown in FIG. 7, before irradiation, the control unit 22 causes the scan driving unit 15 to sequentially apply the ON voltage from the gate driver 15b to the lines L1 to Lx of the scan lines 5 so as to perform the radiation detection element 7 reset process. When detecting start of irradiation, the control unit 22 causes the scan driving unit 15 to apply the OFF voltage from the gate driver 15b to the lines L1 to Lx of the scan lines 5 so as to shift to the electric charge accumulation state. When irradiation finishes, the control unit 22 causes the scan driving unit 15 to sequentially apply the ON voltage from the gate driver 15b to the lines L1 to Lx of the scan lines 5 so as to perform the image data D readout process.

The present invention is applicable to both image capturing with the cooperation system and image capturing with the non-cooperation system. The radiation image capturing apparatus 1 is further configured to repeat, before or after performing image capturing as described above, the sequence of the processes up to the image data D readout process, which are shown in FIG. 6, but in a state in which the radiation image capturing apparatus 1 is not irradiated, thereby performing an offset data O readout process to read offset data O instead of the image data D readout process.

In each radiation detection element 7, dark electric charge (also called dark current or the like) is constantly generated by thermal excitation caused by heat (temperature) of the radiation detection element 7 itself, and an offset component due to the dark electric charge is superimposed on the image data D. The dark image data O is data equivalent to the offset component due to the dark electric charge. Offset correction is performed on the image data D, whereby true image data D* resulting from the electric charge generated by and in the irradiated radiation detection element 7 can be calculated by the following formula (1), namely, by subtracting the dark image data O from the image data D.

$$D^* = D - O \quad \text{[Formula (1)]}$$

[Noise Detection Unit]

Next, the configuration and so forth of a noise detection unit of the radiation image capturing apparatus 1 of the embodiment are described. The noise detection unit detects data equivalent to noise components superimposed on the image data D read in the image data D readout process as described above. The noise detection unit may be disposed on the front/upper surface 4a side or the back/lower surface side of the sensor board 4 (see FIG. 2), or may be disposed on the aforementioned flexible circuit board. Note that the alpha-numerals pointed by arrows in FIG. 8 indicate where the wirings/lines are connected.

Figure 8:
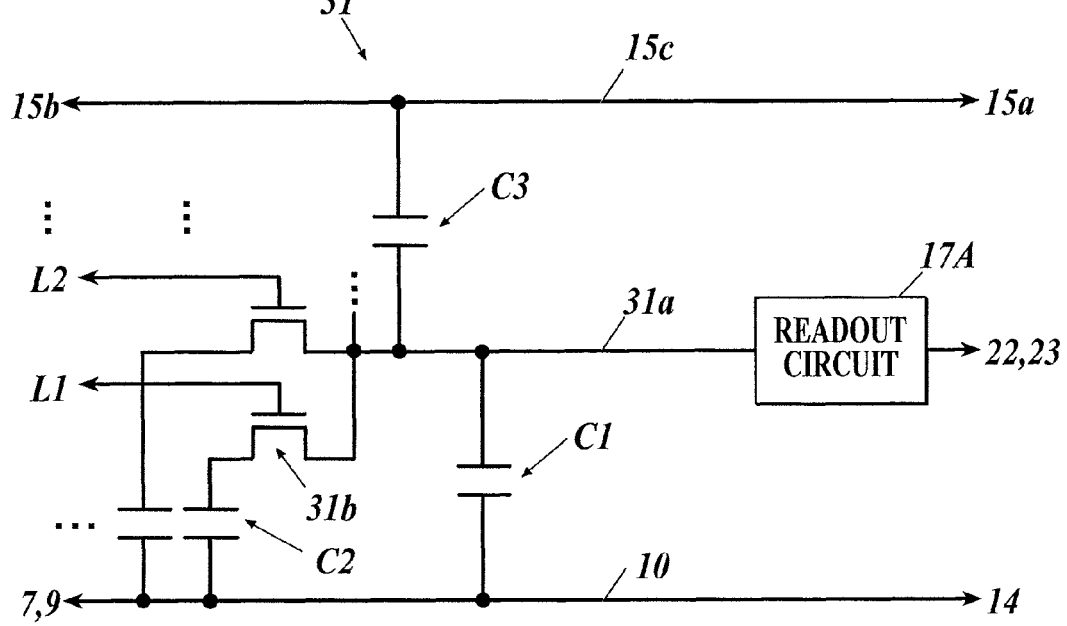
FIG. 8 shows a configuration example of a noise detection unit.

In the embodiment, as shown in FIG. 8, a noise detection unit 31 includes: a correction signal line 31a; first to third capacitors C1 to C3; and a readout circuit 17A connected to the correction signal line 31a. In the embodiment, as the readout circuit 17A of the noise detection unit 31, a readout circuit 17 formed in the readout IC 16 (see FIG. 3 and FIG. 4) is used.

Hence, in the embodiment, the readout circuit 17A of the noise detection unit 31 includes, as with the readout circuit 17 (see FIG. 3 and FIG. 4) which reads the image data D, the integrating circuit 18 and the correlated double sampling circuit 19 (not shown in FIG. 8). Further, as with the above-described signal line(s) 6, the reference voltage $V_0$ is applied to the correction signal line 31a via the integrating circuit 18 of the readout circuit 17A.

Figure 9:
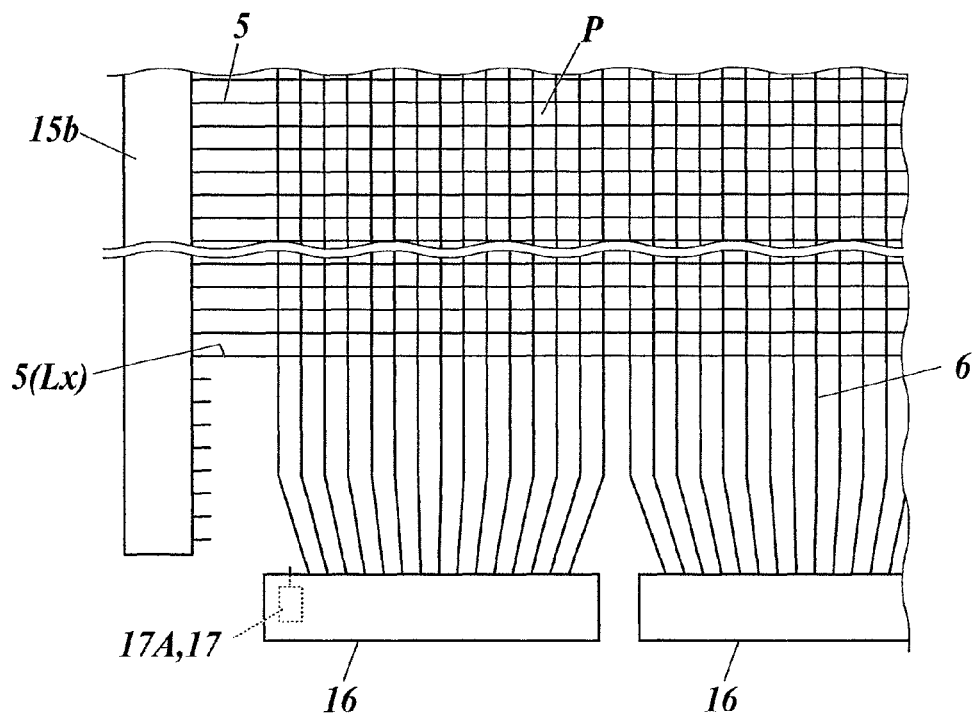
FIG. 9 is an illustration to explain that a readout circuit to which no signal line is connected is used as a readout circuit of the noise detection unit.

In the embodiment, as the readout circuit 17A of the noise detection unit 31, as shown in FIG. 9 as an example, a readout circuit 17 to which no signal line 6 is connected (e.g. a readout circuit 17 at an end of the readout IC 16) is used, and, although not shown, the correction signal line 31a of the noise detection unit 31 is connected to the readout circuit 17 to which no signal line 6 is connected.

Further, in the embodiment, as with the image data D readout process, the readout circuit 17A of the noise detection unit 31 detects data $d_{31}$, the A/D convertor 20 converts the detected data $d_{31}$ into digital data $d_{31}$, and the digital data $d_{31}$ is stored in the storage unit 23. It is unnecessary to use the existing readout circuit 17 of the readout IC 16 as the readout circuit 17A of the noise detection unit 31, and a readout circuit separate from the readout IC 16 may be provided as the readout circuit 17A.

Among the capacitors C1 to C3, the first capacitor C1 is a capacitor which converts potential difference between the correction signal line 31a and the tie line 10 (or the bias lines 9) into electric charge, and the third capacitor C3 is a capacitor which converts potential difference between the correction signal line 31a and the wiring 15c, via which the OFF voltage to be applied to the scan lines 5 is supplied from the power supply circuit 15a to the gate driver 15b of the scan driving unit 15, into electric charge.

In the embodiment, the second capacitor C2 is a capacitor which converts potential difference between the correction signal line 31a and the tie line 10 into electric charge. The second capacitors C2 are provided for the respective lines L1 to Lx of the scan lines 5. Each second capacitor C2 is connected with a switching unit 31b which switches connection of the second capacitor C2 and the correction signal line 31a between connecting and disconnecting.

The ON state and the OFF state of the switching units 31b are switched by the ON voltage and the OFF voltage applied to the lines L1 to Lx of the scan lines 5. When the ON voltage is applied to a scan line 5, the TFTs 8 and the switching unit 31b connected to the scan line 5 go into the ON state, and when the OFF voltage is applied to the scan line 5, the TFTs 8 and the switching unit 31b connected to the scan line 5 go into the OFF state.

Thus, in the embodiment, each switching unit 31b switches between the ON state and the OFF state to coincide with the ON state and the OFF state of the TFTs 8, which are switching elements, connected to the same scan line 5 as the switching unit 31b is connected to. In the embodiment, as shown in FIG. 8, pairs, each of which is constituted of a second capacitor C2 and a switching unit 31b, are provided to be the same number as the number of scan lines 5. The switching units 31b may also be constituted of TFTs.

Figure 10:
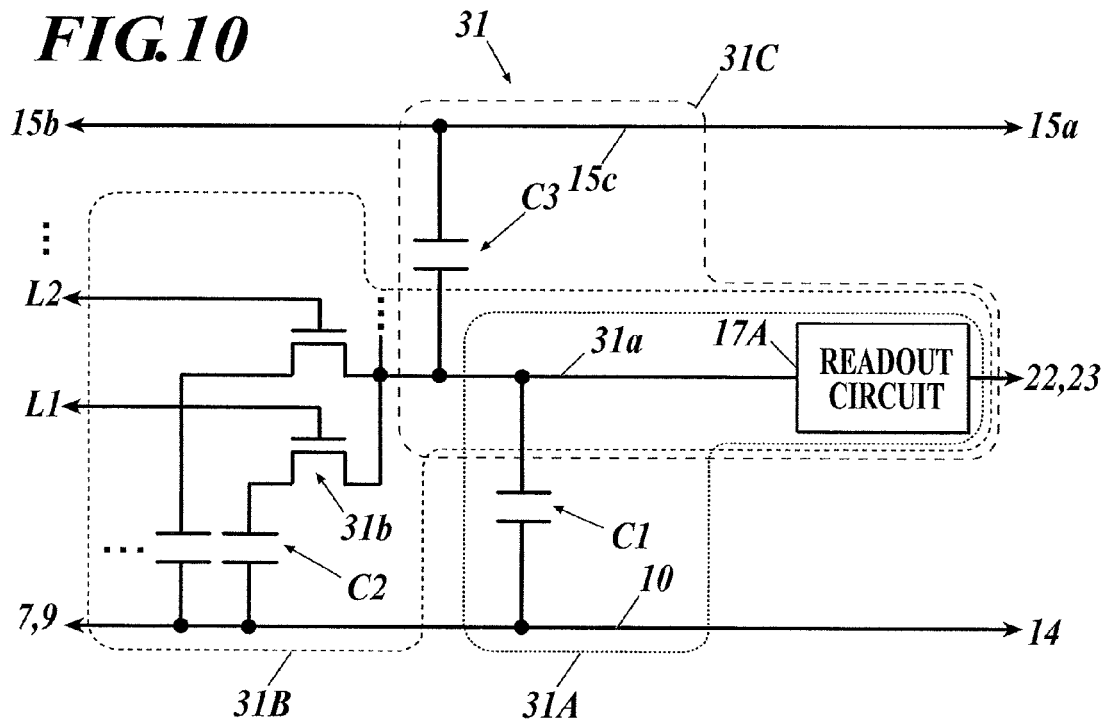
FIG. 10 is an illustration to explain that the noise detection unit shown in FIG. 8 is constituted of multiple noise detection units.

The configuration of the noise detection unit 31 shown in FIG. 8 is, to be specific, one into which noise detection units 31A, 31B and 31C described below are united as shown in FIG. 10. These noise detention units 31A, 31B and 31C may be provided individually, or any two of these may be combined.

For details of the noise detection unit 31, refer to Patent Document 1. Hereinafter, the nose detection units 31A, 31B and 31C are briefly described.

[Noise Detection Unit 31A]

Figure 22:
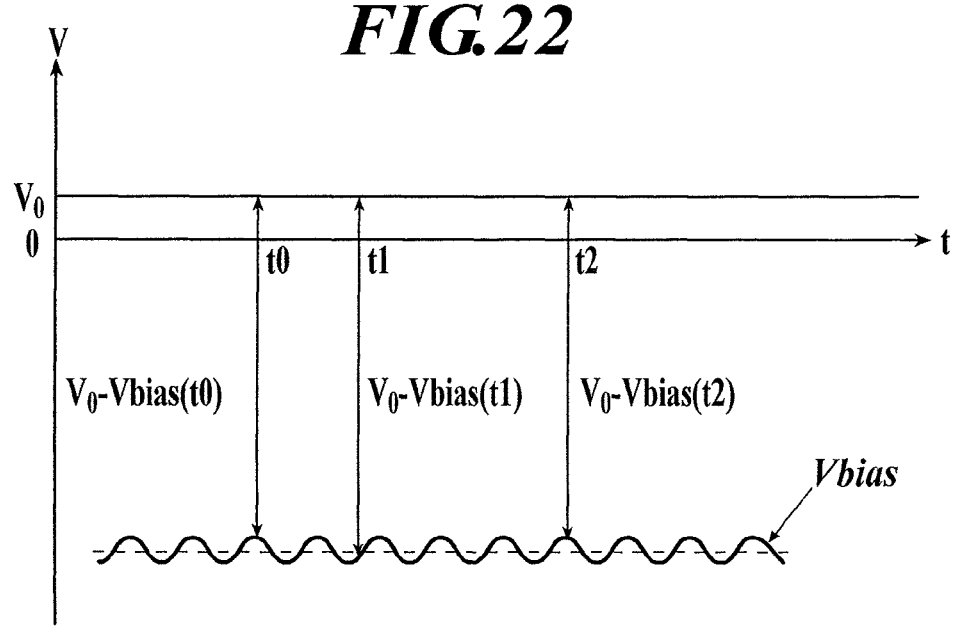
FIG. 22 is a graph showing noise in the reverse bias voltage.

In the noise detection unit 31A, an electric charge of $c1 \times (V_0 - Vbias)$, where c1 is the capacitance of the first capacitor C1, is accumulated in the first capacitor C1. However, because the voltage noise is generated in the reverse bias voltage Vbias as shown in FIG. 22, the electric charge noise equivalent thereto is generated in the electric charge accumulated in the first capacitor C1. Further, the electric charge noise which fluctuates at the exact same phase as the above is generated in the electric charge accumulated in each radiation detection element 7. The capacitance c1 of the first capacitor C1 is set to be the same as that of one radiation detection element 7.

In the image data D readout process, the control unit 22 sends, as shown in FIG. 5B, each of the first pulse signal Sp1 and the second pulse signal Sp2 to the correlated double sampling circuits 19 of the readout circuits 17, which read the respective image data D, and to the correlated double sampling circuit 19 of the readout circuit 17A of the noise detection unit 31 at the same time.

Hence, the data $d_{31}$ detected by the readout circuit 17A of the noise detection unit 31 contains noise data dn showing the electric charge noise equivalent to the voltage noise of the reverse bias voltage Vbias, the noise data dn being superimposed on the respective image data D which the readout circuits 17 read at the same timing as the readout circuit 17A detects the data $d_{31}$. Hereinafter, this noise data dn is called noise data dnA resulting from the voltage noise of the reverse bias voltage Vbias(t).

The noise detection unit 31A detects the data $d_{31}$ containing the noise data dnA and the detected data $d_{31}$ is stored in the storage unit 23 each time the ON voltage is applied from the gate driver 15b to one of the lines L1 to Lx of the scan lines 5 and the image data D are read in the image data D readout process (i.e. each time the control unit 22 sends the first and second pulse signals Sp1 and Sp2 to the correlated double sampling circuits 19 and the image data D are read with respect to one of the lines L1 to Lx of the scan lines 5).

[Noise Detection Unit 31C]

Next, before the noise detection unit 31B, the noise detection unit 31C is described. The noise detection unit 31C includes: the third capacitor C3; the wiring 15c, via which the OFF voltage Voff is supplied from the power supply circuit 15a to the gate driver 15b of the scan driving unit 15 (or the scan line(s) 5 to which the OFF voltage is applied (the same applies hereinafter)); the correction signal line 31a; and the readout circuit 17A.

As with the above-described reverse bias voltage Vbias, because the voltage noise is generated in the OFF voltage Voff too at random in terms of time, the electric charge noise equivalent thereto is generated in an electric charge of $c3 \times (V_0 - \text{Voff})$, where c3 is the capacitance of the third capacitor C3, accumulated in the third capacitor C3.

Meanwhile, as described above, in the image data D readout process, the electric charges accumulated in the radiation detection elements 7 connected to the scan line 5 to which the ON voltage is applied from the gate driver 15b are released to the signal lines 6 via the TFTs 8 in the ON state and flow into the readout circuits 17.

At the time, the OFF voltage Voff is applied to several thousands of the scan lines 5 except the scan line 5 to which the ON voltage is applied. As shown in FIG. 2 (see the "B" part), the parasitic capacitances c are generated at the intersection parts of the signal lines 6 with the scan lines 5. Hence, at each intersection part, the electric charge calculated as the product of this parasitic capacitance c multiplied by potential difference $V_0 - \text{Voff}$, which is difference between the voltage $V_0$ of the signal line 6 and the OFF voltage Voff, is accumulated. Further, as described above, the voltage noise is generated in the OFF voltage Voff too.

Hence, if the capacitance c3 of the third capacitor C3 is set to be equal to the sum total $\Sigma c$ of the parasitic capacitances c formed at the intersection parts of one signal line 6 with the respective scan lines 5, the data $d_{31}$ detected by the readout circuit 17A of the noise detection unit 31C contains noise data dnC showing the electric charge noise (the sum total of the electric charge noises at the intersection parts) equivalent to the voltage noise of the OFF voltage Voff, the noise data dnC being superimposed on the respective image data D which the readout circuits 17 read at the same timing as the readout circuit 17A detects the data $d_{31}$.

The noise detection unit 31C detects the data $d_{31}$ containing the noise data dnC and the detected data $d_{31}$ is stored in the storage unit 23 each time the ON voltage is applied from the gate driver 15b to one of the lines L1 to Lx of the scan lines 5 and the image data D are read in the image data D readout process (i.e. each time the control unit 22 sends the first and second pulse signals Sp1 and Sp2 to the correlated double sampling circuits 19 and the image data D are read with respect to one of the lines L1 to Lx of the scan lines 5).

[Noise Detection Unit 31B]

The noise detention unit 31A detects the data $d_{31}$ containing the noise data dnA as the amount of fluctuation in electric charge noise equivalent to the difference between (i) the voltage noise of the reverse bias voltage Vbias at the time when the control unit 22 sends the first pulse signal Sp1 to the correlated double sampling circuit 19 of the readout circuit 17A of the noise detection unit 31 and (ii) the voltage noise of the reverse bias voltage Vbias at the time when the control unit 22 sends the second pulse signal Sp2 thereto in the image data D readout process, and the noise detection unit 31C detects the data $d_{31}$ containing the noise data dnC as the amount of fluctuation in electric charge noise equivalent to the difference between (i) the voltage noise of the OFF voltage Voff at the time when the control unit 22 sends the first pulse signal Sp1 to the correlated double sampling circuit 19 of the readout circuit 17A of the noise detection unit 31 and (ii) the voltage noise of the OFF voltage Voff at the time when the control unit 22 sends the second pulse signal Sp2 thereto in the image data D readout process.

The image data D further contains noise data dnB as the amount of fluctuation in electric charge noise equivalent to the difference between (i) the voltage noise of the reverse bias voltage Vbias at the time when the voltage applied to the TFTs 8 is switched from the ON voltage to the OFF voltage in the radiation detection element 7 reset process (see FIG. 6 and FIG. 7) and (ii) the voltage noise of the reverse bias voltage Vbias at the time when the voltage applied to the TFTs 8 is switched from the ON voltage to the OFF voltage in the image data D readout process, which is performed after the radiation detection element 7 reset process.

The noise detection unit 31B detects the data $d_{31}$ containing this noise data dnB. In the noise detection unit 31B, the capacitance c2 of each second capacitor C2 is set to be equal to the parasitic capacitance of each radiation detection element 7 (or the average value of the parasitic capacitances of the radiation detection elements 7) connected to the line Ln of the scan lines 5, the line Ln being connected to the switching unit 31b connected to the second capacitor C2. When the ON voltage is sequentially applied from the gate driver 15b to the lines L1 to Lx of the scan lines 5 as shown in FIG. 6 and FIG. 7, the ON voltage is sequentially applied to the switching units 31b of the noise detection unit 31B too.

By this configuration, as shown in FIG. 6 and FIG. 7, in the radiation detection element 7 reset process, when the voltage applied to TFTs 8 and their corresponding switching unit 31b of the noise detection unit 31B is switched from the ON voltage to the OFF voltage, the voltage noise generated in the reverse bias voltage Vbias at the time is accumulated in its corresponding second capacitor C2 as the electric charge noise.

Then, in the image data D readout process, when the ON voltage is applied to the TFTs 8 and the switching unit 31b of the noise detection unit 31B, and the readout circuit 17A of the noise detection unit 31B detects the data $d_{31}$ at the time when the applied voltage is switched from the ON voltage to the OFF voltage, the detected data $d_{31}$ contains the above-described noise data dnB superimposed on the respective image data D after all.

In the embodiment, the noise detection unit 31B detects the data $d_{31}$ containing the noise data dnB superimposed on the respective read image data D and the detected data $d_{31}$ is stored in the storage unit 23.

Further, as it is known from the configuration shown in FIG. 8 and FIG. 10, in the embodiment, the data $d_{31}$ containing the noise data dnA, dnB and dnC is detected. Hereinafter, the sum total value of these (dnA+dnB+dnC) is described as the noise data dn with respect to each of the lines L1 to Lx of the scan lines 5. However, as described above, the noise detection units 31A, 31B and 31C may be configured to be individual so that the data $d_{31}$ containing the noise data dnA, the data $d_{31}$ containing the noise data dnB and the data $d_{31}$ containing the noise data dnC can be detected individually.

Figure 11:
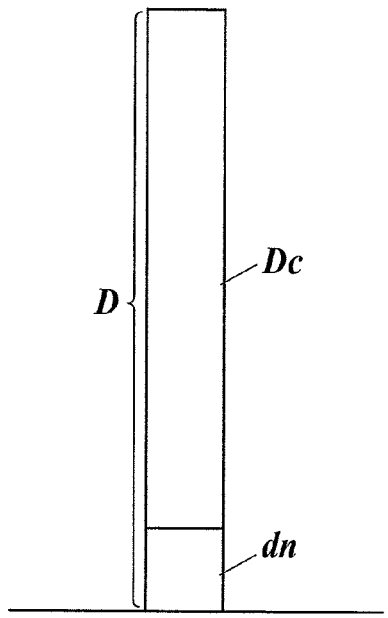
FIG. 11 is an illustration to show read image data containing noise data and to explain corrected image data.

As shown in FIG. 11, corrected image data Dc is calculated by the following formula (2), namely, by subtracting, from the image data D read from each radiation detection element 7 as described above, the noise data dn contained in the data $d_{31}$ detected by the noise detection unit 31 at the same timing as the image data D is read. This can remove influence of the above-described horizontal noise from the image data D.

$$Dc=D-dn \qquad \text{[Formula (2)]}$$

[Offset Component of Readout Circuit Itself]

Figure 12:
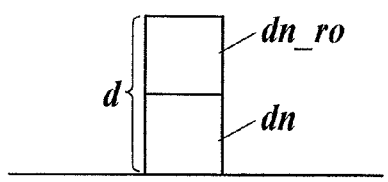
FIG. 12 is an illustration to explain that data detected by the noise detection unit contains, in addition to the noise data, an offset component of the noise detection unit.

However, as described in Patent Document 1 (see second embodiment thereof), although it depends on performance of the readout circuit 17A of the noise detection unit 31 (in the embodiment, the same as the readout circuits 17, which read the respective image data D), the data $d_{31}$ detected by the noise detection unit 31 actually contains, in addition to the noise data dn (=dnA+dnB+dnC), an offset component dn_ro of the readout circuit 17A itself of the noise detection unit 31 as shown in FIG. 12.

Hence, the readout circuit 17A of the noise detection unit 31 detects the sum total value of the noise data dn and the offset component dn_ro of the readout circuit 17A as the data $d_{31}$ (or "d"). When this is used to correct the image data D in the same manner as the above, the corrected image data Dc is expressed by the following formula (3).

$$Dc=D-d$$

$$\therefore Dc=D-(dn+dn\_ro) \qquad \text{[Formula (3)]}$$

Figure 13:
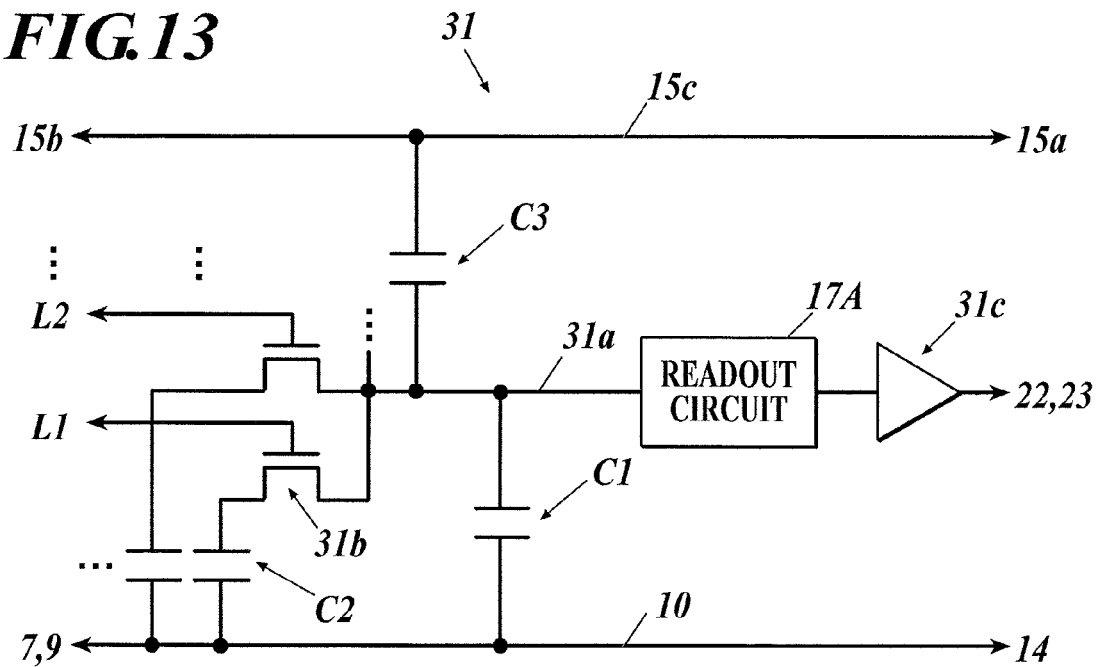
FIG. 13 shows another configuration example of the noise detection unit.

In Patent Document 1, as the capacitances c1 to c3 of the capacitors C1 to C3 of the noise detection unit 31, those shown in FIG. 8 and FIG. 10 multiplied by W (W>1) are used, and also a multiplier 31c is provided on the output side of the readout circuit 17A of the noise detection unit 31 as shown in FIG. 13 so that the output value from the readout circuit 17A can be multiplied by 1/W.

Figure 14:
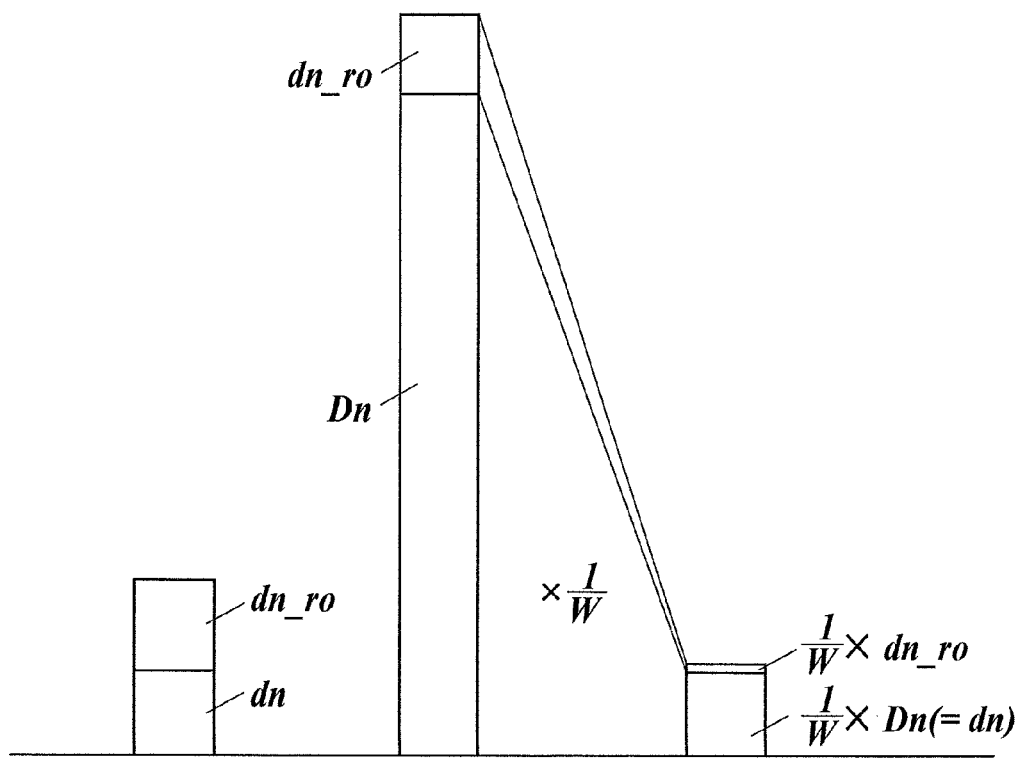
FIG. 14 is an illustration to explain, by comparing the noise detection units shown in FIG. 8 and FIG. 13, that the noise detection unit shown in FIG. 13 multiplies the offset component of the noise detection unit by 1/W.

By this configuration, as shown at the center of FIG. 14, the readout circuit 17A of the noise detection unit 31 outputs, as the data $d_{31}$, the sum total value of: noise data Dn, which is W times larger than the noise data dn; and the offset component dn_ro (not multiplied by W) of the readout circuit 17A. Then, the multiplier 31c multiplies the data $d_{31}$ by 1/W, thereby multiplying the noise data Dn by 1/W (1/W×Dn) and multiplying the offset component dn_ro of the readout circuit 17A by 1/W (1/W×dn_ro). The noise data Dn multiplied by 1/W equals the noise data dn.

Figure 15:
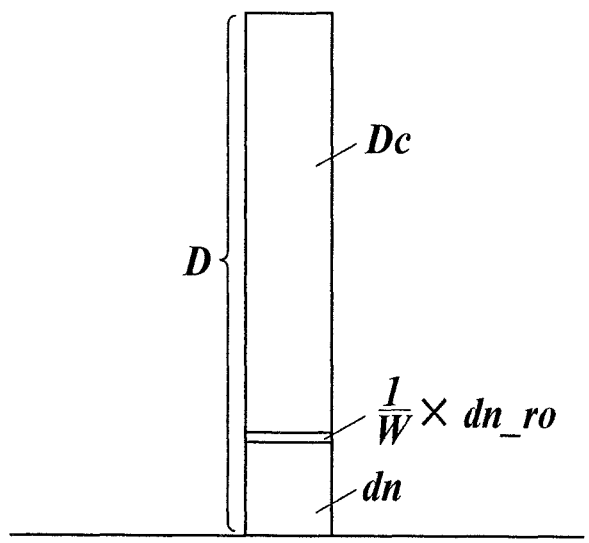
FIG. 15 is an illustration to explain that the noise detection unit shown in FIG. 13 eliminates as much influence of the offset component of the noise detection unit on corrected image data as possible.

As shown in FIG. 15, the above configuration can reduce influence of the offset component dn_ro of the readout circuit 17A of the noise detection unit 31 on the image data D to 1/W while keeping the noise data dn as it is. If the value of W is set to a sufficiently large value, its reciprocal, 1/W, becomes very small. This can eliminate as much influence of the offset component dn_ro of the readout circuit 17A of the noise detection unit 31 on corrected image data Dc as possible. These are described in Patent Document 1.

[Offset Component with Respect to Each Readout IC]

However, even when influence of the horizontal noise is removed by the above configuration, the artifacts may appear in the captured radiation images as described above. In particular, in the case of moving image capturing, a plurality of radiation images (frame images) is captured, and the artifact(s) may appear in each frame image. In the case of plain radiography (still image capturing) too, if image capturing is performed right after the radiation image capturing apparatus 1 is woken up from the sleep state, the artifact(s) may appear in the captured radiation image.

Figure 16:
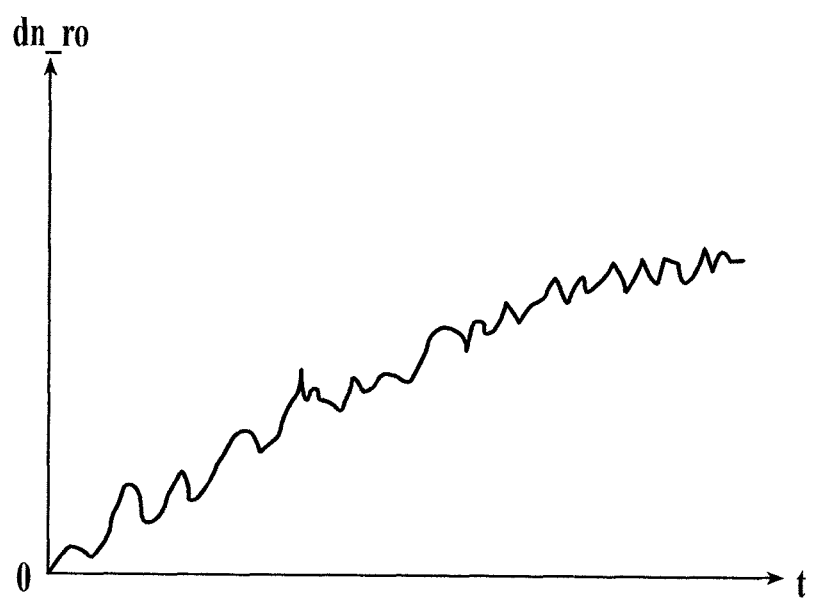
FIG. 16 is a graph showing change in the offset component of the noise detection unit with time.

According to the studies of the inventors of this application, the cause of such a phenomenon is change in the above-described offset component dn_ro of the readout circuit 17A of the noise detection unit 31 (hereinafter simply "offset component dn_ro of the noise detection unit 31") with time as shown in FIG. 16. The main cause of the change (increase) in the offset component dn_ro of the noise detection unit 31 with time is change (increase) in temperature of the readout circuit 17A of the noise detection unit 31 with time.

Change in the offset component dn_ro with time occurs not only in the readout circuit 17A of the noise detection unit 31, but also in the readout circuits 17, which read the respective image data D. In each readout circuit 17 too, as the temperature thereof changes (increases) with time, the offset component dn_ro thereof changes (increases) with time. However, because its circuit configuration is different from that of the noise detection unit 31, this change is different from that of the noise detection unit 31. In addition, if a plurality of readout ICs 16 is provided, and noise detection units 31 are disposed in the respective readout ICs 16, the change rate (increase rate) of the offset component dn_ro with time differs from a readout IC 16 to a readout IC 16.

Hence, in the embodiment, the control unit 22 of the radiation image capturing apparatus 1 estimates the offset component dn_ro (hereinafter "dn_roA") of the noise detection unit 31, and calculates the noise data dn based on the data $d_{31}$ detected by the readout circuit 17A of the noise detection unit 31 and the estimated offset component dn_roA of the noise detection unit 31, namely, by the following formula (4).

$$dn=d_{31}-dn\_roA \qquad \text{[Formula (4)]}$$

Then, the control unit 22 obtains the corrected image data Dc by the following formula (5) which corresponds to the above formula (3), namely, by subtracting the calculated noise data dn from the image data D of each radiation detection element 7 read by each readout circuit 17.

$$Dc=D-dn \qquad \text{[Formula (5)]}$$

Hereinafter, some configuration examples to perform the above process are described in detail. Further, advantageous effects of the radiation image capturing apparatus 1 of the embodiment of the present invention are described.

As one configuration example, there is a way of estimating the offset component dn_roA of the noise detection unit 31 based on the data $d_{31}$ detected during the image data D readout process. That is, the offset component dn_roA of the noise detection unit 31 can be estimated by detecting the data $d_{31}$ a predetermined number of times, and calculating the average value thereof.

Figure 17A:
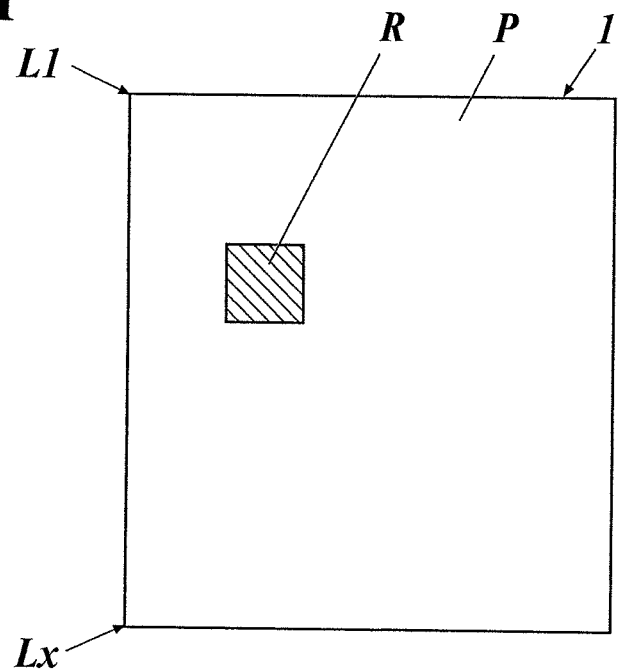
FIG. 17A shows that radiation is emitted to the radiation image capturing apparatus in the state in which the irradiation field is narrowed.
Figure 17B:
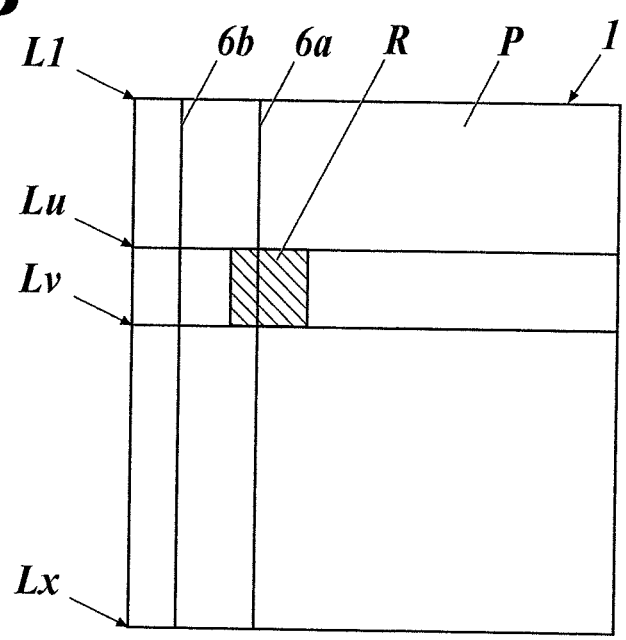
FIG. 17B shows that radiation is emitted to the radiation image capturing apparatus in the state in which the irradiation field is narrowed.
Figure 18A:
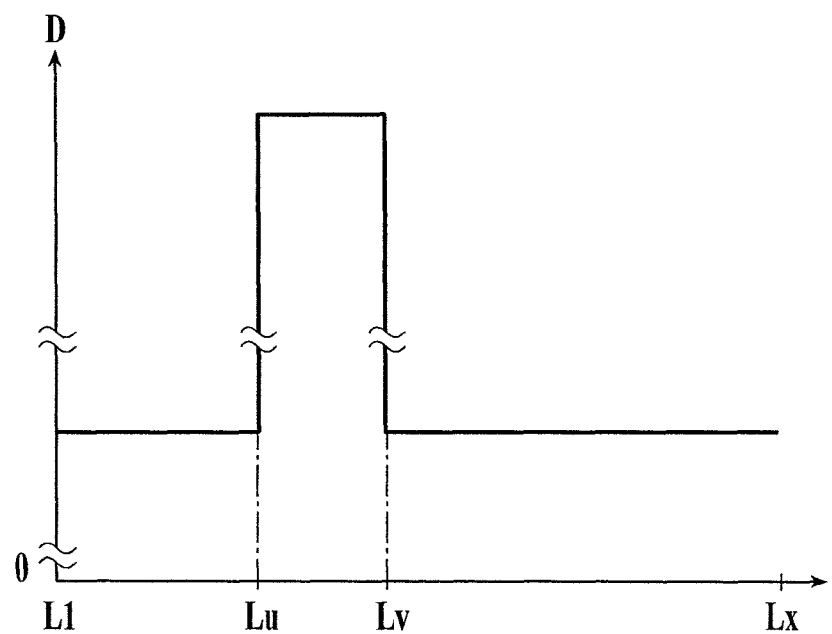
FIG. 18A is a graph showing image data read from radiation detection elements connected to a signal line which passes through the irradiation field.

However, suppose, as shown in FIG. 17A, that radiation is emitted to the detection section P of the radiation image capturing apparatus 1 in the state in which the irradiation field R is narrowed. If the range of the irradiation field R, to which the radiation is emitted, of the radiation image capturing apparatus 1 is lines Lu to Lv of the scan lines 5 as shown in FIG. 17B, the image data D read from the radiation detection elements 7 connected to a signal line 6a or the like which passes through the irradiation field R show greatly larger values at the portion of the lines Lu to Lv of the scan lines 5 than at the other portions as shown in FIG. 18A, as a matter of course.

Figure 18B:
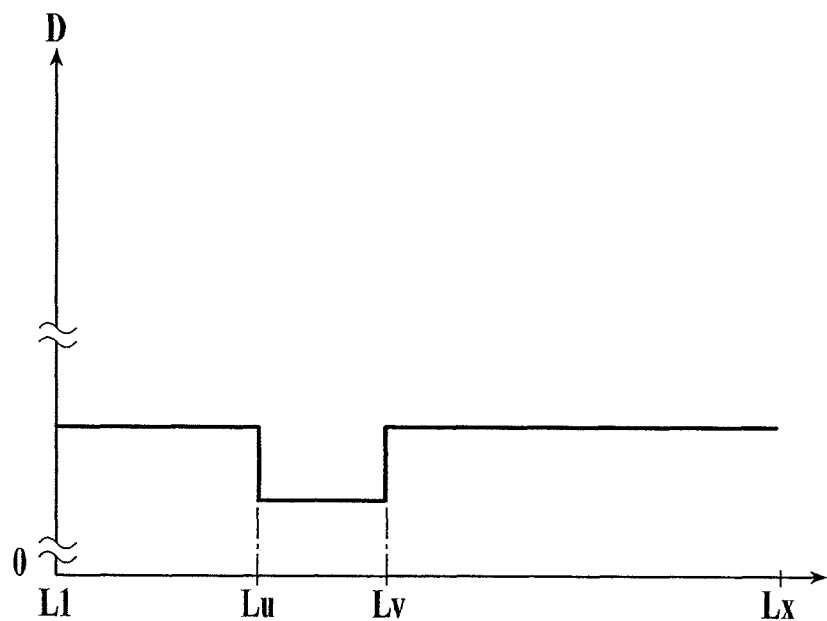
FIG. 18B is a graph showing image data read from radiation detection elements connected to a signal line which passes through the outside of the irradiation field.

Meanwhile, with respect to the image data D read from the radiation detection elements 7 connected to a signal line 6b (see FIG. 17B) which passes through the outside of the irradiation field R, although they seem likely to show the same value at any portion because the radiation detection elements 7 are not irradiated, they actually show smaller values at the portion of the lines Lu to Lv (i.e. the portion equivalent to the irradiation field R) of the scan lines 5 than at the other portions as shown in FIG. 18B.

Hence, in the noise detection unit 31 too, when the switching units 31b connected to the lines L1 to Lx, which include the lines Lu to Lv, of the scan lines 5 are ON/OFF-controlled and the data $d_{31}$ are detected, the same phenomenon as that shown in FIG. 18B could occur in the detected data $d_{31}$.

When this phenomenon occurs, even if the ON voltage is sequentially applied to, for example, 30 scan lines 5 including the lines Lu to Lv of the scan lines 5 and accordingly the switching units 31b of the noise detection unit 31 sequentially go into the ON state, and the average value of the detected data $d_{31}$ is calculated, they do not cancel each other out and the average value does not become 0. Accordingly, the offset component dn_roA of the noise detection unit 31 may not be estimated correctly. Then, the present invention is configured, for example, as described in configuration examples which are now described in detail.

Configuration Example 1

For example, in advance, the control unit 22 causes the readout circuit 17A of the noise detection unit 31 to perform a readout action a predetermined number of times (e.g. 30 times) in the state in which the radiation image capturing apparatus 1 is not irradiated and the OFF voltage Voff is applied from the gate driver 15b to the lines L1 to Lx of the scan lines 5, and calculates the average value of the read data d.

The data d read by each readout circuit 17 as described above contains the noise data do corresponding to the voltage noise of the reverse bias voltage Vbias and/or the OFF voltage Voff. However, when the average value of the data d of a predetermined number of times is calculated with respect to each readout IC 16 as described above, the noise data do cancel each other out. Hence, the above average value can be regarded as the offset component dn_roA of the noise detection unit 31.

Figure 19:
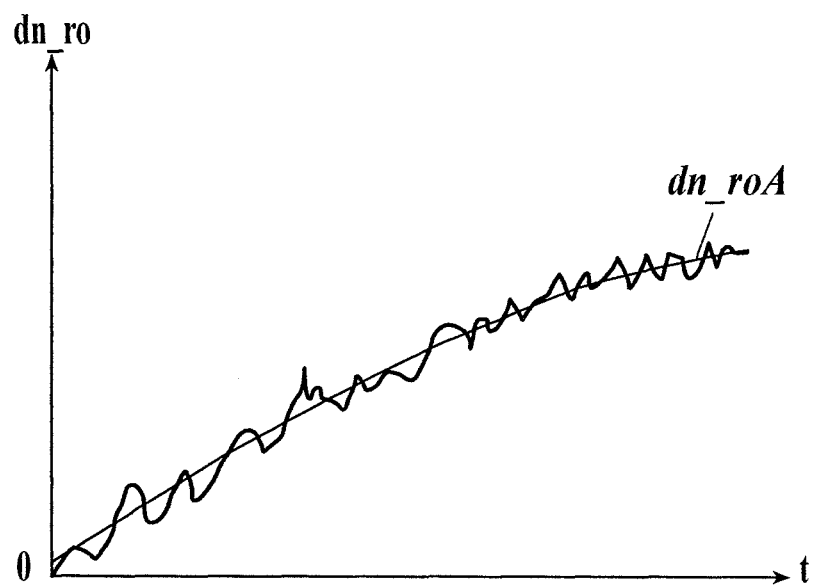
FIG. 19 is a graph showing change in the offset component of the noise detection unit or in the offset component thereof with respect to one of readout ICs 16 with time and an approximate curve to approximate the same.

When the readout action is repeatedly performed, and the temperature of the noise detection unit 31 changes with time, as shown in FIG. 19 as an example, a profile of the change in the offset component dn_roA of the noise detection unit 31 with time can be obtained. FIG. 19 shows only one profile of the change in the offset component dn_roA with time. However, if a plurality of readout ICs 16 is provided, and noise detection units 31 are disposed in the respective readout ICs 16, the profile is obtained for each noise detection unit 31.

Then, for each profile, the control unit 22 calculates an approximate curve to approximate the profile, and stores a formula and/or a table representing the approximate curve in the storage unit 23, the ROM or the like, or writes the same in a program. Thus, the radiation image capturing apparatus 1 has information on each approximate curve of the offset component dn_roA in advance.

At the time of the actual image capturing, after emission of radiation but before start of the image data D readout process (see FIG. 6 and FIG. 7) (i.e. in the state in which the radiation image capturing apparatus 1 is not irradiated and the OFF voltage Voff is applied from the gate driver 15b to the lines L1 to Lx of the scan lines 5, which is the same as the state described above), the control unit 22 causes the readout circuit 17A of the noise detection unit 31 to perform the above data $d_{31}$ detection action (readout action) a predetermined number of times, calculates the average value of the detected data $d_{31}$ and estimates the offset component dn_roA of the noise detection unit 31.

The estimation of the offset component dn_roA of the noise detection unit 31 may be performed in the above state right after the image data D readout process. Further, in the case of the cooperation system shown in FIG. 6, because the control unit 22 knows the timing when the radiation emission apparatus emits radiation to the radiation image capturing apparatus 1, the control unit 22 may estimate the offset component dn_roA of the noise detection unit 31 in the above state before the radiation emission apparatus emits radiation to the radiation image capturing apparatus 1.

The control unit 22 causes the noise detection unit 31 to perform the data $d_{31}$ detection action a predetermined number of times before or after emission of radiation or right after the image data D readout process as described above, and also during the image data D readout process, causes the noise detection unit 31 to detect the data $d_{31}$ at the same time as each image data D is read as described above.

Because the data $d_{31}$ detected at the same time as each image data D is read contains the offset component dn_roA of the noise detection unit 31 estimated as described above, the control unit 22 calculates the noise data dn by the following formula (6), namely, by subtracting the estimated offset component dn_roA of the noise detection unit 31 from the detected data $d_{31}$.

$$dn = d_{31} - dn\_roA \quad \text{[Formula (6)]}$$

Then, the control unit 22 obtains the corrected image data Dc by the following formula (7) which is the same as the above formula (5), namely, by subtracting the calculated noise data dn from the image data D of each radiation detection element 7 read in the image data D readout process.

$$Dc = D - dn \quad \text{[Formula (7)]}$$

In the case where the dark image data O are read before or after image capturing as described above, before or right after this dark image data O readout process, the control unit 22 may cause the readout circuit 17A of the noise detection unit 31 to perform the data $d_{31}$ detection action a predetermined number of times, calculate the average value of the detected data $d_{31}$ and estimate the offset component dn_roA of the noise detection unit 31, which are the same as the above, and correct the dark image data O (obtain corrected dark image data Oc). In this case, the true image data D* is calculated by the above formula (1) where Dc and Oc are substituted for D and O, respectively. The same applies to the following configuration examples.

Further, the noise detection unit 31 may be configured as shown in FIG. 8 or as shown in FIG. 13. The same applies to the following configuration examples.

Configuration Example 2

The configuration example 1 is described on the assumption that plain radiography (still image capturing) is performed. In the case where moving image capturing is performed by the radiation image capturing apparatus 1, the following configuration is available as an example.

If the dark image data O readout process is performed in this case, it is preferable to perform the dark image data O readout process before moving image capturing. In this case too, the dark image data O can be corrected as described above.

At the time of moving image capturing, the radiation emission apparatus emits radiation to the radiation image capturing apparatus 1 in succession. The control unit 22, for example, causes the readout circuits 17 to read the respective image data D of the first frame image when radiation is emitted (received), and stores the same in the storage unit 23 (at the same time, causes the noise detection unit 31 to detect the data $d_{31}$, and stores the same in the storage unit 23), and right after that, causes the noise detection unit 31 to perform the data $d_{31}$ detection action a predetermined number of times, and stores the detected data $d_{31}$ of the predetermined number of times in the storage unit 23.

For each frame image, the control unit 22 repeats the image data D readout process (and the data $d_{31}$ detection process) and the process to detect the data $d_{31}$ a predetermined number of times, and stores the image data D (and the data $d_{31}$) and the data $d_{31}$ of the predetermined number of times, which have been read or detected, in the storage unit 23. When moving image capturing finishes, the control unit 22 performs, for example, the process to estimate the offset component dn_roA of the noise detection unit 31 based on the data $d_{31}$ of the predetermined number of times, as described above.

The control unit 22 can correct the image data D and the dark image data O based thereon, thereby calculating the corrected image data Dc and the corrected dark image data Oc, and calculate the true image data D* based thereon. The control unit 22 may calculate the corrected image data Dc and so forth without waiting for the moving image capturing to finish, namely, between capturing a frame image and capturing another, or the like, if the time is enough.

Configuration Example 3

In the configuration example 1, it is described to use the offset component dn_roA of the noise detection unit 31 estimated right before or right after the image data D readout process. Alternatively, the offset component dn_roA of the noise detection unit 31 estimated may be used in relation to the elapsed time.

That is, for example, before image capturing, the control unit 22 causes the readout circuit 17A of the noise detection unit 31 to perform the data $d_{31}$ detection action a predetermined number of times, thereby detecting the data $d_{31}$ of the predetermined number of times, in the state in which the radiation image capturing apparatus 1 is not irradiated and the OFF voltage Voff is applied from the gate driver 15b to the lines L1 to Lx of the scan lines 5, and calculates the average value of the data $d_{31}$ and estimates the offset component dn_roA of the noise detection unit 31.

Figure 20:
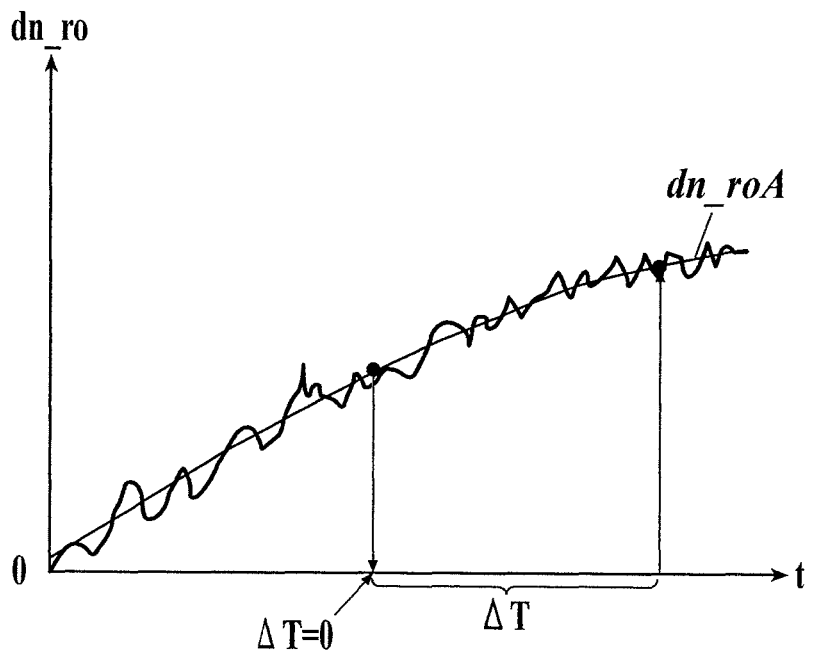
FIG. 20 is an illustration to explain how to estimate the offset component of the noise detection unit from elapsed time.

Then, a time point corresponding to the estimated offset component dn_roA of the noise detection unit 31 is found as shown in FIG. 20, and the elapsed time ΔT is measured (i.e. seconds or the like are counted) with the found time point as the starting point (ΔT=0) If the elapsed time ΔT, namely, the time elapsed from the starting point to the time point when the radiation image capturing apparatus 1 is irradiated so that image capturing is performed and the image data D are read, can be obtained, the control unit 22 can estimate the offset component dn_roA of the noise detection unit 31 of the time (i.e. the elapsed time ΔT) when the image data D are read from the relationship shown in FIG. 20 without estimating the offset component dn_roA of the noise detection unit 31 again.

By this configuration, the offset component dn_roA of the noise detection unit 31 needs to be estimated only one time before or after radiation is emitted to the radiation image capturing apparatus 1. For example, in the case of moving image capturing, if, in the radiation image capturing apparatus 1, the elapsed time ΔT, namely, the time elapsed from the starting point to the time point when the image data D of each frame image is read, can be measured, the control unit 22 can accurately estimate the offset component dn_roA of the noise detection unit 31 without estimating the offset component dn_roA of the noise detection unit 31 again. This can make the processing load of the radiation image capturing apparatus 1 light.

Configuration Example 4

In the above configuration examples 1 to 3, in order to estimate the offset component dn_roA of the noise detection unit 31, before or after emission of radiation or right after the image data D readout process, the data $d_{31}$ is detected (the data $d_{31}$ detection action is performed) a predetermined number of times in the state in which the OFF voltage Voff is applied to the lines L1 to Lx of the scan lines 5 (i.e. the ON voltage is not applied to the scan lines 5) from the gate driver 15b.

Meanwhile, in the image data D readout process, the ON voltage is applied to read the image data D. That is, if not the OFF voltage Voff but the ON voltage is applied to detect the data $d_{31}$, the more likely offset component dn_roA of the noise detection unit 31 can be estimated. However, if the ON voltage is applied before or after the image data D readout process, the image data D are also read, which makes the accumulation period different from the original one, and if the data $d_{31}$ is read/detected at the same time as the image data D, the problem described above with reference to FIG. 18B arises.

Figure 21:
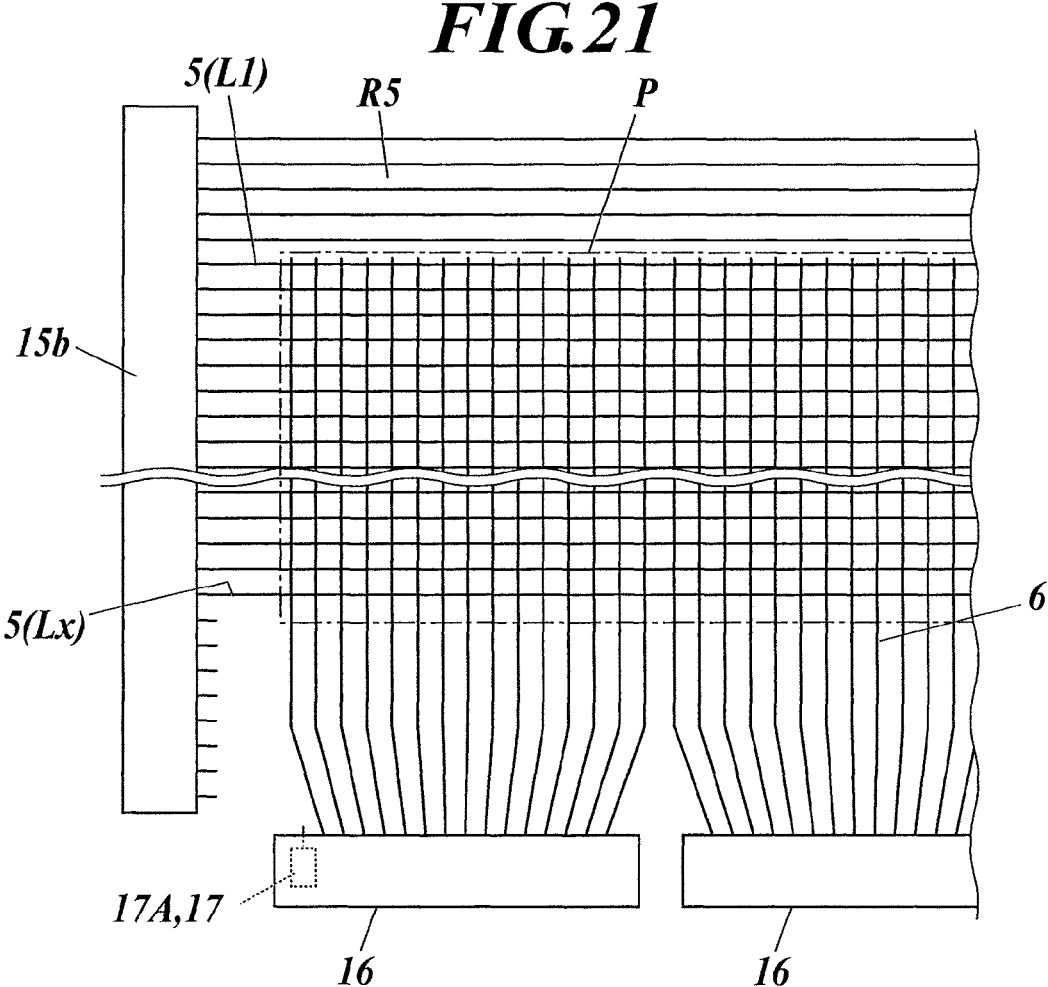
FIG. 21 is an illustration to explain a region of scan lines provided outside the detection section.

Then, as shown in FIG. 21, a region R5 of scan lines 5 is provided outside the detection section P (image data region) indicated by a dot-and-dash line. Then, right before or right after the image data D readout process, the control unit 22 causes the readout circuit 17A of the noise detection unit 31 to perform the readout action a predetermined number of times (e.g. 30 times) in the state in which the ON voltage is applied only to the region R5, and calculates the average value of the detected data $d_n$ and estimates the offset component dn_roA of the noise detection unit 31.

This configuration enables estimation of the offset component dn_roA of the noise detection unit 31 with the ON voltage applied.

Advantageous Effects

As described above, according to the radiation image capturing apparatus 1 of the embodiment, the control unit 22 estimates the offset component dn_roA of the noise detection unit 31, calculates the noise data dn based on the data $d_{31}$ detected by the readout circuit 17A of the noise detection unit 31 and the estimated offset component dn_roA of the noise detection unit 31, and obtains the corrected image data Dc by the above formula (7), namely, by subtracting the calculated noise data dn from the image data D of each radiation detection element 7 read by each readout circuit 17.

The radiation image capturing apparatus described in Patent Document 1 sometimes generates the artifacts (image unevenness) in radiation images captured by plain radiography or in frame images captured by moving image capturing because it only removes the horizontal noise from the image data D. On the other hand, the present invention of the embodiment accurately estimates the offset component dn_roA of the noise detection unit 31 and removes the same from the image data D.

Hence, when the radiation image capturing apparatus 1 of the present invention is used for plain radiography or moving image capturing, influence of the horizontal noise on radiation images or frame images to be captured can be reduced, and also the artifacts can be certainly prevented from appearing in the radiation images or frame images.

Although not shown, there may be provided a first power supply circuit which supplies power to some readout IC(s) 16 and a second power supply circuit which supplies power to the remaining readout IC(s) 16. In this case, if the data $d_{31}$ or the like detected by the noise detection unit 31 using the readout circuit 17A which belongs to the readout IC(s) 16 to which the first power supply circuit supplies power is used to correct the image data D, the image data D read by the readout circuit(s) 17 which belongs to the readout IC(s) 16 to which the second power supply circuit supplies power may not be accurately corrected.

Hence, in such a case, it is preferable to perform the process to correct the image data D described in the above embodiment for each power supply circuit which supplies power to the readout IC(s) 16.

Needless to say, the present invention is not limited to the above embodiment and the like and can be appropriately modified without departing from the spirit of the present invention.

What is claimed is:

1. A radiation image capturing apparatus comprising:
   a plurality of scan lines;
   a plurality of signal lines;
   a plurality of radiation detection elements arranged on a board to be distributed two-dimensionally, the radiation detection elements generating respective electric charges by receiving radiation;
   a plurality of bias lines to apply reverse bias voltage to the radiation detection elements;
   a readout IC which reads respective image data based on the respective electric charges generated by the radiation detection elements, whereby an image data readout process is performed;
   a control unit which controls at least the readout IC; and
   a noise detection unit which, at a time when the respective image data is read by the readout IC, outputs data based on at least one of (i) voltage noise generated in the reverse bias voltage applied to the radiation detection elements via the bias lines and (ii) voltage noise generated in an off voltage applied to the scan lines,
   wherein the control unit:
      estimates an offset component contained in the data output by the noise detection unit, the offset component being caused by the noise detection unit itself;
      calculates noise data based on the data output by the noise detection unit and the estimated offset component; and
      subtracts the calculated noise data from the image data read by the readout IC, thereby generating corrected image data.

2. The radiation image capturing apparatus according to claim 1, further comprising:
   a scan driving unit including:
      a gate driver which switches a voltage to be applied to each of the scan lines between an on voltage and the off voltage; and
      a power supply circuit which supplies the on voltage and the off voltage to the gate driver,
   wherein:
   the readout IC includes a plurality of readout circuits which read, as the respective image data, the respective electric charges released from the radiation detection elements to the signal lines,
   the radiation detection elements are provided with respective switching elements which (i) go into an off state when the off voltage is applied via the scan lines, thereby breaking electrical continuity of the radiation detection elements and the signal lines, and (ii) go into an on state when the on voltage is applied via the scan lines, thereby releasing the electric charges from the radiation detection elements to the signal lines, and
   the noise detection unit includes:
      a correction signal line;
      a capacitor which converts at least one of (i) potential difference between the correction signal line and the bias lines and (ii) potential difference between the correction signal line and the scan lines into an electric charge, whereby the capacitor converts the at least one of (i) the voltage noise generated in the reverse bias voltage applied to the radiation detection elements via the bias lines and (ii) the voltage noise generated in the off voltage applied to the scan lines into electric charge noise; and
      a readout circuit connected to the correction signal line, wherein the readout circuit outputs the data corresponding to the electric charge noise.

3. The radiation image capturing apparatus according to claim 2, wherein:
   the capacitor of the noise detection unit includes a plurality of second capacitors which convert the potential difference between the correction signal line and the bias lines into the electric charge,
   the noise detection unit further includes a plurality of switching units which switch connection of the respective second capacitors and the correction signal line between connecting and disconnecting,
   the switching units are connected to the respective scan lines,
   during a radiation detection element reset process to reset the radiation detection elements and during the image data readout process, the switching units switch between an on state and an off state to coincide with the on state and the off state of the switching elements,
   at a time when each of the radiation detection elements is reset, the second capacitors convert the voltage noise generated in the reverse bias voltage applied to the bias lines into the electric charge noise and accumulate the electric charge noise, and
   at a the time when the image data is read from each of the radiation detection elements, the readout circuit of the noise detection unit outputs and thereby detects the data corresponding to difference between (i) the electric charge noise accumulated at the time when each of the radiation detection elements is reset and (ii) the electric charge noise accumulated at the time when the image data is read from each of the radiation detection elements.

4. The radiation image capturing apparatus according to claim 2, wherein in the noise detection unit, the capacitor converts, as the potential difference between the correction signal line and the scan lines, potential difference between the correction signal line and a wiring which connects the power supply circuit to the gate driver, into the electric charge, and also converts the voltage noise generated in the off voltage applied to the wiring into the electric charge noise, and the readout circuit outputs and thereby detects the data corresponding to the electric charge noise.

5. The radiation image capturing apparatus according to claim 2, wherein at a time of actual image capturing, the control unit causes the readout circuit of the noise detection unit to perform a readout action a predetermined number of times, thereby reading data of the predetermined number of times, in a state in which the radiation image capturing apparatus is not irradiated and the off voltage is applied from the gate driver to the scan lines, and estimates the offset component of the noise detection unit based on the read data.

6. The radiation image capturing apparatus according to claim 2, wherein at a time of actual image capturing, the control unit causes the readout circuit of the noise detection unit to perform a readout action a predetermined number of times, thereby reading data of the predetermined number of times, in a state in which the radiation image capturing apparatus is not irradiated and the on voltage is applied from the gate driver to only scan lines which are not connected to an image data region, and estimates the offset component of the noise detection unit based on the read data.

7. The radiation image capturing apparatus according to claim 5, wherein the control unit estimates the offset component of the noise detection unit before or after the radiation is emitted or right after the image data readout process is performed.

8. The radiation image capturing apparatus according to claim 5, wherein the control unit estimates the offset component of the noise detection unit multiple times before or after the radiation is emitted or right after the image data readout process is performed, and estimates the offset component of the noise detection unit of the time when each of the image data is read from change in the offset component with time, the change being obtained by estimating the offset component multiple times.

* * * * *